(12) United States Patent
Kwon et al.

(10) Patent No.: US 10,429,932 B2
(45) Date of Patent: Oct. 1, 2019

(54) MOBILE TERMINAL

(71) Applicant: LG ELECTRONICS INC., Seoul (KR)

(72) Inventors: Yunmi Kwon, Seoul (KR); Younhwa Choi, Seoul (KR); Yoojin Choi, Seoul (KR); Huran Choi, Seoul (KR); Jihye Ham, Seoul (KR); Jihee Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/861,019

(22) Filed: Jan. 3, 2018

(65) Prior Publication Data

US 2018/0284892 A1 Oct. 4, 2018

(30) Foreign Application Priority Data

Apr. 4, 2017 (KR) .................. 10-2017-0043928
Apr. 4, 2017 (KR) .................. 10-2017-0043930

(51) Int. Cl.
| G06F 3/01 | (2006.01) |
| G06F 3/041 | (2006.01) |
| G06F 3/0488 | (2013.01) |
| G06F 3/0481 | (2013.01) |

(52) U.S. Cl.
CPC ............ G06F 3/016 (2013.01); G06F 3/0412 (2013.01); G06F 3/0414 (2013.01); G06F 3/0416 (2013.01); G06F 3/04817 (2013.01); G06F 3/04883 (2013.01); *G06F 2203/04105* (2013.01); *G06F 2203/04106* (2013.01)

(58) Field of Classification Search
None
See application file for complete search history.

(56) References Cited

U.S. PATENT DOCUMENTS

| 2002/0010718 | A1 | 1/2002 | Miller |
| 2006/0132455 | A1 | 6/2006 | Rimas-Ribikauskas et al. |
| 2011/0161892 | A1 | 6/2011 | Hamadene |
| 2012/0146945 | A1 | 6/2012 | Miyazawa et al. |
| 2014/0362014 | A1 | 12/2014 | Ullrich et al. |
| 2016/0085878 | A1* | 3/2016 | Kang ............ G06F 16/954 715/201 |
| 2016/0259528 | A1* | 9/2016 | Foss .............. G06F 3/0482 |
| 2016/0274686 | A1* | 9/2016 | Alonso Ruiz ..... G06F 3/03547 |
| 2016/0357389 | A1* | 12/2016 | Dakin ............ G06F 3/0482 |
| 2017/0115793 | A1* | 4/2017 | Namgoong ........ G06F 1/1647 |
| 2017/0316250 | A1* | 11/2017 | Roh ............... H04M 1/72519 |

* cited by examiner

*Primary Examiner* — Christopher J Kohlman
(74) *Attorney, Agent, or Firm* — Birch, Stewart, Kolasch & Birch, LLP

(57) ABSTRACT

The present invention relates to a mobile terminal. The present invention changes views related to an item having view transitions in stages when intensity of touch input applied to the item exceeds a critical intensity and outputs an appropriate feedback when a view changed during view transition according to a plurality of touch inputs is the last view, to thereby intuitively notify a user of the last view.

18 Claims, 42 Drawing Sheets

FIG. 12
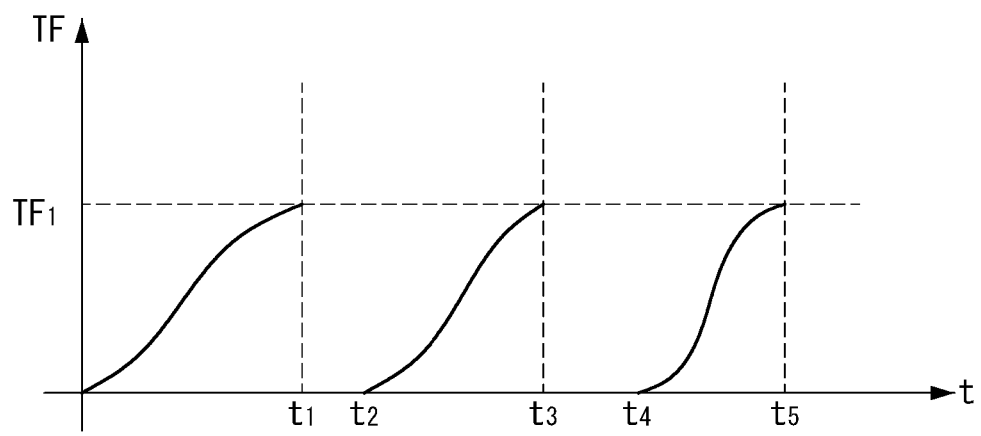
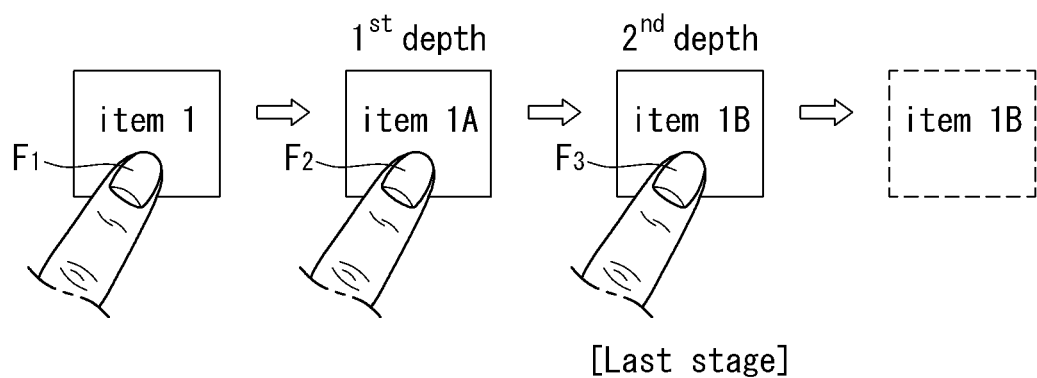
[Last stage]

[Last stage]

[ F1 ] --------> [ F2 ] --------> [ F3 ]

[Last stage]

( $F_2 \geq F_1$ )

FIG. 17b
[ $F_2(P_3) > F_2(P_2) > F_2(P_1) \geq F_1$ ]
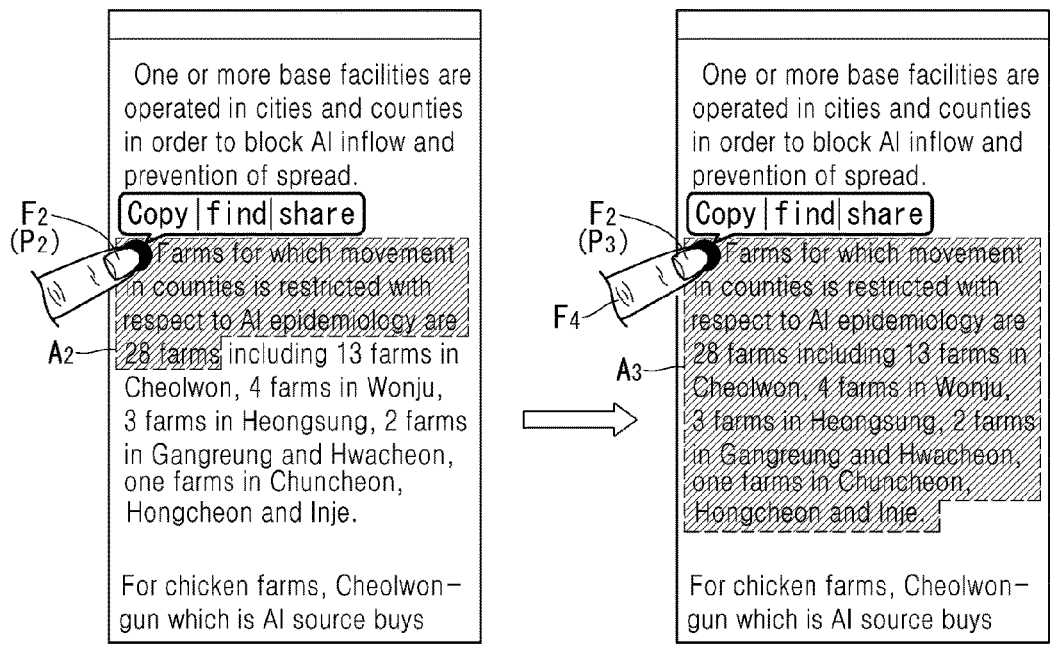
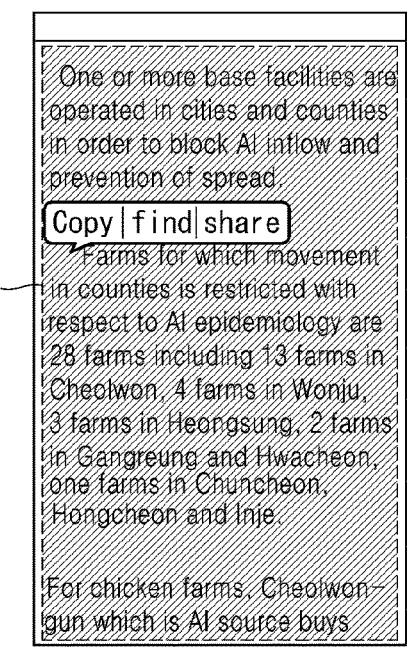

FIG. 29
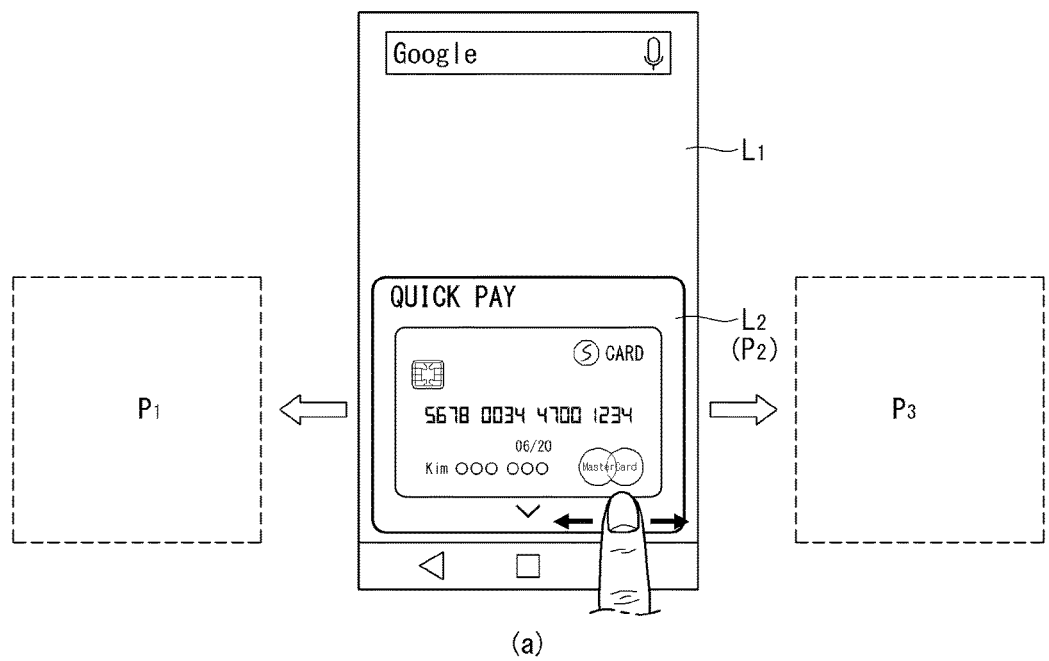
(a)
(b)
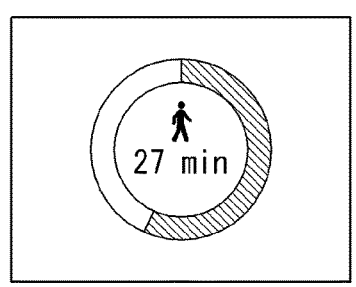
(c)
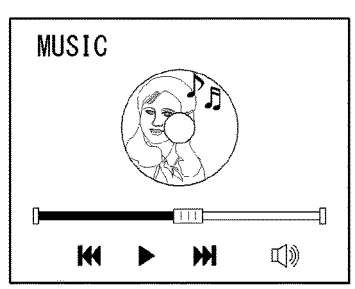
(e)
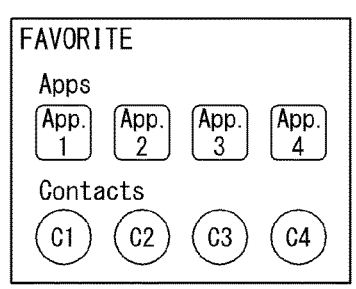
(d)

FIG. 31
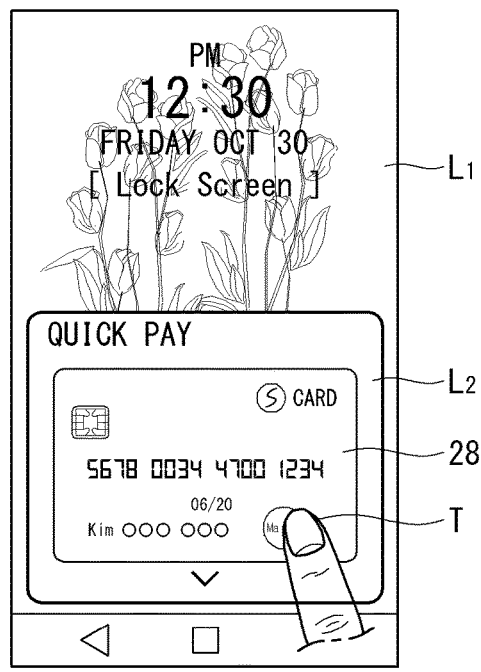
(a)
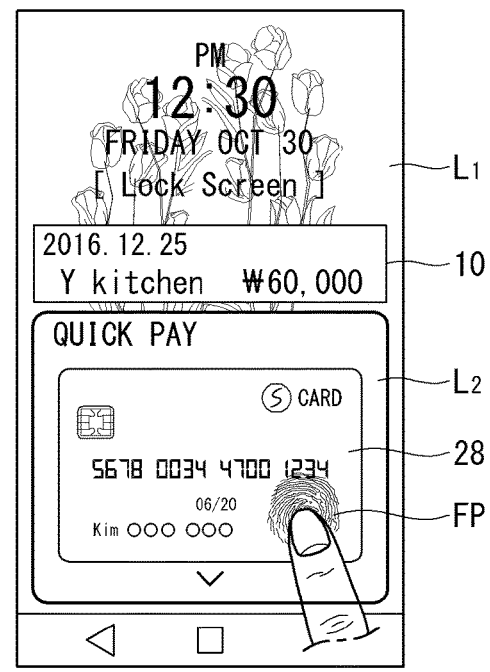
(b)

FIG. 32
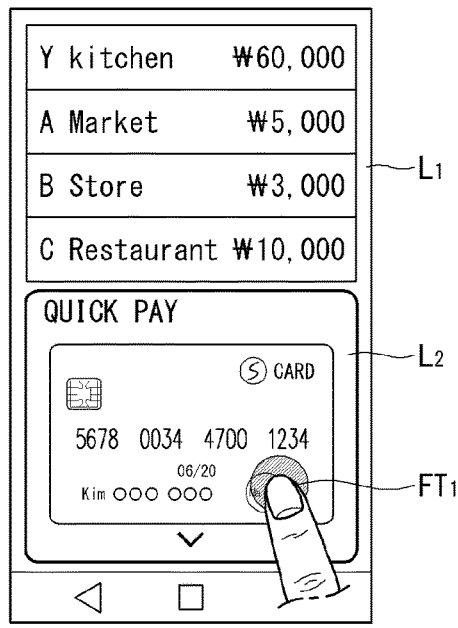
(a)
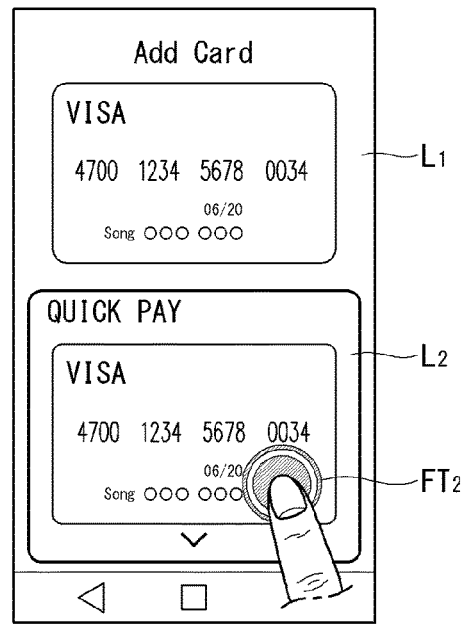
(b)
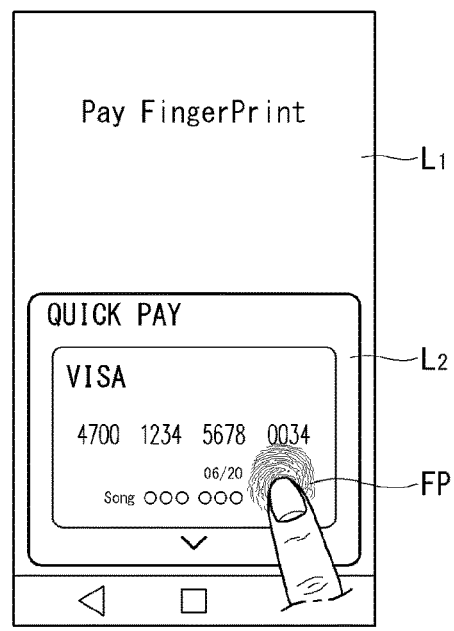
(c)

(a)  (b)

MOBILE TERMINAL

CROSS-REFERENCE TO RELATED APPLICATIONS

Pursuant to 35 U.S.C § 119(a), this application claims the benefit of earlier filing date and right of priority to Korean Patent Application No. 10-2017-0043928 filed on Apr. 4, 2017, and No. 10-2017-000043930 filed on Apr. 4, 2017, the contents of which are hereby incorporated by reference in its entirety.

BACKGROUND OF THE DISCLOSURE

1. Field of the Disclosure

The present invention relates to a mobile terminal, and more specifically, to a mobile terminal having a force touch function applied to execution of various functions thereof.

2. Background of the Disclosure

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, since the function of the mobile terminal is diversified as described above, the number of touch inputs may increase when the diversified function is executed through touch operation. Furthermore, in transition between various pages, a user cannot remember all page transitions through touch input due to increase in the number of touch inputs. Accordingly, it is necessary to develop a technology for realizing various functions through touch operation using a simpler method.

SUMMARY OF THE DISCLOSURE

Accordingly, an object of the present invention is to address the above-noted and other problems.

An object of the present invention is to provide a mobile terminal providing a user interface through which a user can control the mobile terminal easily and efficiently and a method of controlling the mobile terminal.

An object of the present invention is to provide a mobile terminal and a method of controlling the same which can control execution of applications through a simpler method by applying force touch to execution of applications in which view transition occurs in stages.

In addition, an object of the present invention is to provide a mobile terminal and a method of controlling the same which can provide efficient feedback with respect to a view of the last stage when the view of the last stage is displayed during page transition through force touch such that a user can intuitively recognize entrance to the last stage.

Furthermore, an object of the present invention is to provide a mobile terminal and a method of controlling the same which can control display to be returned to a desired page of the user among previous pages through a simpler method when the view of last stage is displayed during page transition through force touch.

Moreover, an object of the present invention is to provide a mobile terminal and a method of controlling the same which can control content in various manners using force touch by providing different functions executed through force touch depending on types of content provided through the view of the last stage during page transition through force touch.

In addition, an object of the present invention is to provide a mobile terminal and a method of controlling the same which can easily execute a desired function of an application without completely entering an execution screen of the application through force touch.

Furthermore, an object of the present invention is to provide a mobile terminal and a method of controlling the same which can execute a larger number of functions through a smaller number of touch operations and a smaller number of times of view transition by associating one of a plurality of layers with force touch and/or a fingerprint recognition function in control of functions of the mobile terminal using the plurality of layers.

A mobile terminal according to one aspect of the present invention includes: a body; a touchscreen provided to the front side of the body; a force sensor configured to sense touch intensity of touch input applied to the touchscreen; and a controller configured to control a first screen including an item having view transition in stages to be displayed on the touchscreen according to selected input, to control views related to the item to change when intensity of first touch input applied to the item exceeds a critical intensity, and to control a predetermined feedback to be output when a changed view is a view of the last stage.

The controller may control the predetermined feedback to be output while the view of the last stage is maintained when intensity of second touch input applied to the view of the last stage exceeds the critical intensity.

When there is no view to be changed with respect to the item, a currently displayed view may be the view of the last stage related to the item.

The controller may change the first screen to a first view related to the item when the intensity of the first touch input exceeds the critical intensity, change the first view to a second view and display the second view when intensity of second touch input applied to the first view exceeds the critical intensity, and determine the first view as the last view when the second view is identical to the first view.

Output of the predetermined feedback may be display of at least one thumbnail image corresponding to at least one view sequentially displayed prior to the last stage on the touchscreen.

The controller may display the view of the last stage along with the thumbnail image on the touchscreen. Accordingly, the view of the last stage provides thumbnails without additional force touch, and thus it is possible to intuitively recognize the view of the last stage.

The controller may display the thumbnail image on the touchscreen upon reception of additional touch input applied to the view of the last stage and having intensity exceeding the critical intensity. That is, when additional force touch input is received through the view of the last stage, the thumbnail image may be provided to notify a user of the view of the last stage.

The thumbnail image may be displayed in one of upper and lower areas of the touchscreen.

When input for selecting one of the at least one thumbnail image is received, the controller may display a view of a stage corresponding to the selected thumbnail image on the touchscreen. That is, it is possible to easily return to a desired view of a previous stage from the view of the last stage.

The first view may be a webpage including at least one item mapped to link information used to enter the next stage.

The at least one item may include at least one of text, an image, a moving image and a graphical object.

The view of the last stage may include text, wherein the controller enters a mode for selecting a text designation range when second touch input applied to the text is maintained for a predetermined time and controls a text range designated on the basis of the touch point of the second touch input to be sequentially changed when intensity of the second touch input sequentially changes while the second touch input is maintained.

The designated text range may include at least one of a word, a sentence and a paragraph.

The view of the last stage may include an image, wherein the controller controls a display magnification of the image to be changed on the basis of the touch point of second touch input applied to a point of the image when the intensity of the second touch input sequentially changes while the second touch input is maintained.

The mobile terminal may further include a haptic module, wherein the controller controls the haptic module to output a haptic signal having specific intensity simultaneously with transition of views related to the item when the intensity of the first touch input exceeds the critical intensity.

The haptic signal may be output whenever transition between views related to the item occurs to intuitively notify a user that view transition occurs depending on touch intensity.

The controller may display a pop-up view related to the item such that the pop-up view overlaps with at least part of the first screen while display of the first screen is maintained when the intensity of the first touch input corresponds to a first critical intensity, control views related to the item to change when the intensity of the first touch input exceeds a second critical intensity greater than the first critical intensity while the first touch input is maintained, and display a changed view instead of the first screen on the touchscreen.

When the pop-up view is provided, display characteristics of the first screen may be changed. For example, the first screen may be blurred to enhance relative visibility of the pop-up view.

The force sensor may include at least one of a capacitive sensor and an ultrasonic sensor.

The first screen may include a second layer displayed while overlapping with at least part of a first layer through swipe input applied to a bottom edge of the touchscreen in a state in which the first layer is displayed in the entire area of the touchscreen, wherein the second layer includes at least one application executable in the mobile terminal or at least one control menu through which a use environment of the mobile terminal is set.

A mobile terminal according to another aspect of the present invention includes: a body; a touchscreen provided to the front side of the body; a force sensor configured to sense intensity of touch input applied to the touchscreen; and a controller configured to display a first view including at least one application item on the touchscreen, to display a pop-up window including at least one menu item executable using an application such that the pop-up window overlaps with at least part of the first view while display of the first view is maintained when intensity of touch input applied to an icon corresponding to the application exceeds a critical intensity, and to execute a specific menu item through the pop-up window while display of the first view is maintained upon reception of input for selecting the specific menu item through the pop-up window.

A mobile terminal according to another aspect of the present invention includes: a body; a touchscreen provided to the front side of the body, a force sensor configured to sense intensity of touch input applied to the touchscreen or variation in the intensity; a fingerprint sensor configured to recognize a user's fingerprint through the touch input; and a controller configured to display a first layer in the entire area of the touchscreen, to display a second layer on the touchscreen such that the second layer overlaps with part of the first layer upon reception of predetermined touch input, and to control a view displayed on the first layer while display of the second layer is maintained when intensity of touch input applied to the second layer changes.

When intensity of first touch input applied to an item included in the second layer exceeds the critical intensity, the controller may display a view related to the item on the first layer in a state in which the second layer is displayed.

The controller may display a first view related to the item on the first layer when the intensity of the first touch input corresponds to a first critical intensity and display a second view related to the item on the first layer when the intensity of the first touch input changes to a second critical intensity greater than the first critical intensity while the first touch input is maintained.

The predetermined touch input may include swipe input applied to a bottom edge of the touchscreen.

The second layer may be displayed such that the second layer overlaps with the first layer to a predetermined height in the lower area of the first layer.

When touch input applied to the second layer satisfies at least one of input maintained for a predetermined time, input which exceeds predetermined intensity and input applied to an item which requires authentication, the function of the fingerprint sensor may be activated to perform fingerprint authentication according to the touch input.

The item included in the second layer may include information additionally provided after fingerprint authentication and the controller may display the additionally provided information on the first layer after fingerprint authentication.

The controller may display a plurality of pages having different attributes on the second layer, wherein the controller displays a second layer on the second layer upon reception of flicking input applied to the second layer while a first page is displayed on the second layer.

The attributes of the plurality of pages may be determined by items displayed in the pages, and the items may include at least one of a menu for setting a use environment of the mobile terminal, a widget, at least one application selected according to a predetermined criterion from at least one application executed in the mobile terminal and an application which requires authentication.

When the mobile terminal is in a lock state, the controller may display a lock screen on the first layer.

The controller may display a plurality of pages having different attributes on the second layer through flicking input. When a page to be displayed on the second layer through the flicking input is a page having an attribute including personal information among the plurality of pages, the fingerprint sensor may be activated and a fingerprint input interface through which the user's finger is input may be provided to the second layer.

The controller may release the lock state of the mobile terminal and display an unlock screen on the first layer upon completion of fingerprint authentication through the fingerprint input interface, and display the page including personal information according to fingerprint authentication on the second layer.

The controller may control the second layer to disappear from the touchscreen upon reception of touch input applied to the first layer while the first layer and the second layer are displayed.

The force sensor and the fingerprint sensor may be implemented as one ultrasonic sensor module.

Further scope of applicability of the present invention will become apparent from the detailed description given hereinafter. However, it should be understood that the detailed description and specific examples, while indicating preferred embodiments of the invention, are given for illustration only, since various changes and modifications within the spirit and scope of the invention will become apparent to those skilled in the art from this detailed description.

The mobile terminal and the method of controlling the same according to the present invention have the following advantages.

According to the present invention, it is possible to provide a user interface through which a user can easily and efficiently control the mobile terminal.

Furthermore, according to the present invention, it is possible to control execution of applications using a simpler method by applying force touch to execution of applications in which view transition occurs in stages.

According to the present invention, it is possible to control execution of applications through a simpler method by applying force touch to execution of applications in which view transition occurs in stages.

According to the present invention, it is possible to provide efficient feedback with respect to a view of the last stage when the view of the last stage is displayed during page transition through force touch such that a user can intuitively recognize entrance to the last stage.

According to the present invention, it is possible to control display to be returned to a desired page of the user among previous pages through a simpler method when the view of last stage is displayed during page transition through force touch.

According to the present invention, it is possible to control content in various manners using force touch by providing different functions executed through force touch depending on types of content provided through the view of the last stage during page transition through force touch.

According to the present invention, it is possible to easily execute a desired function of an application without completely entering an execution screen of the application through force touch.

According to the present invention, it is possible to execute a larger number of functions through a smaller number of touch operations and a smaller number of times of view transition by associating one of a plurality of layers with force touch and/or a fingerprint recognition function in control of functions of the mobile terminal using the plurality of layers.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 12 is a diagram for describing the concept of a last stage view according to force touch input according to the first embodiment of the present invention;

FIGS. 17A to 18 are diagrams for describing a second embodiment of the present invention;

FIG. 29 is a diagram for describing a plurality of pages which can be displayed through a second layer;

FIGS. 30 and 31 are diagrams for describing a case in which an embodiment of the present invention is applied to a lock state of the mobile terminal;

FIGS. 32 and 33 are diagrams for describing an example in which a force touch function is realized in combination with a fingerprint sensing function.

DETAILED DESCRIPTION OF THE PREFERRED EMBODIMENTS

Figure 1A:
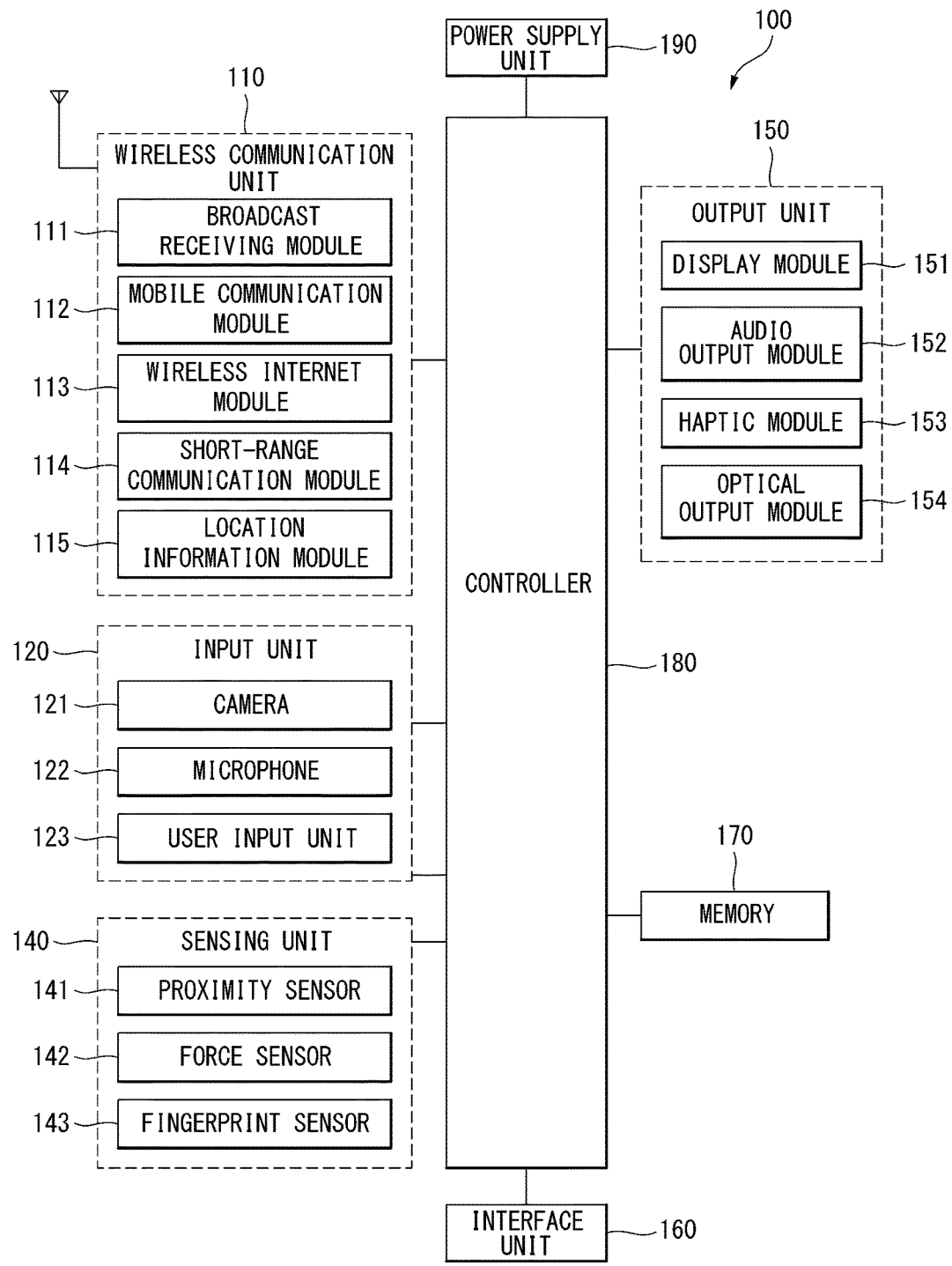
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as proximity sensor (141), illumination sensor (142), a touch sensor, an acceleration sensor (144), a magnetic sensor, a G-sensor, a gyroscope sensor (143), a motion sensor, an RGB sensor, an infrared (IR) sensor, a force sensor (145), a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touchscreen. The touchscreen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1a, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touchscreen through software processing, or a touch key which is located on the mobile terminal at a location that is other than the touchscreen. On the other hand, the virtual key or the visual key may be displayed on the touchscreen in various shapes, for example, graphical, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touchscreen, or near the touchscreen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touchscreen is implemented as a capacitance type, the proximity sensor 141 can sense proximity of a pointer relative to the touchscreen by changes of an electromagnetic field, which is responsive to an approach of an object with conductivity. In this case, the touchscreen (touch sensor) may also be categorized as a proximity sensor.

The term "proximity touch" will often be referred to herein to denote the scenario in which a pointer is positioned to be proximate to the touchscreen without contacting the touchscreen. The term "contact touch" will often be referred to herein to denote the scenario in which a pointer makes physical contact with the touchscreen. For the position corresponding to the proximity touch of the pointer relative to the touchscreen, such position will correspond to a position where the pointer is perpendicular to the touchscreen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touchscreen. In addition, the controller 180 can control the mobile terminal 100 to execute different operations or process different data according to whether a touch with respect to a point on the touchscreen is either a proximity touch or a contact touch.

A touch sensor can sense a touch applied to the touchscreen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touchscreen or a touch key provided in addition to the touchscreen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touchscreen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphical user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographical scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touchscreen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EE-PROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touchscreen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 1B:
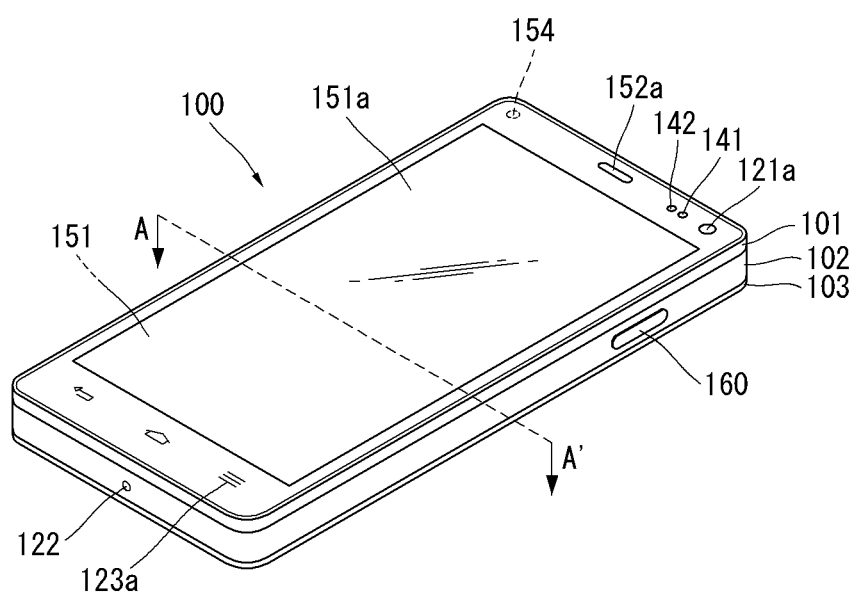
FIGS. 1B and 1C are conceptual views of one example of the mobile terminal, viewed from different directions.
Figure 1C:
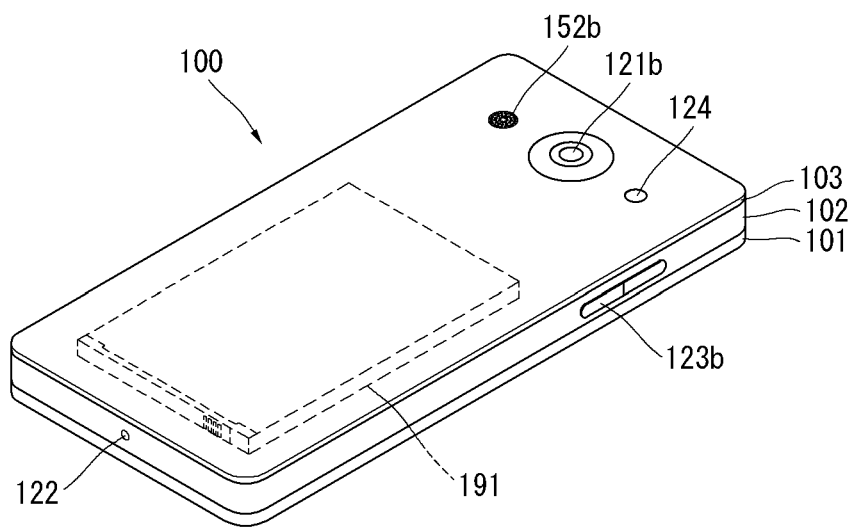

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touchscreen together with the touch sensor. Here, the touchscreen may serve as the user input unit 123 (see FIG. 1A). Therefore, the touchscreen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touchscreen.

Figure 2:
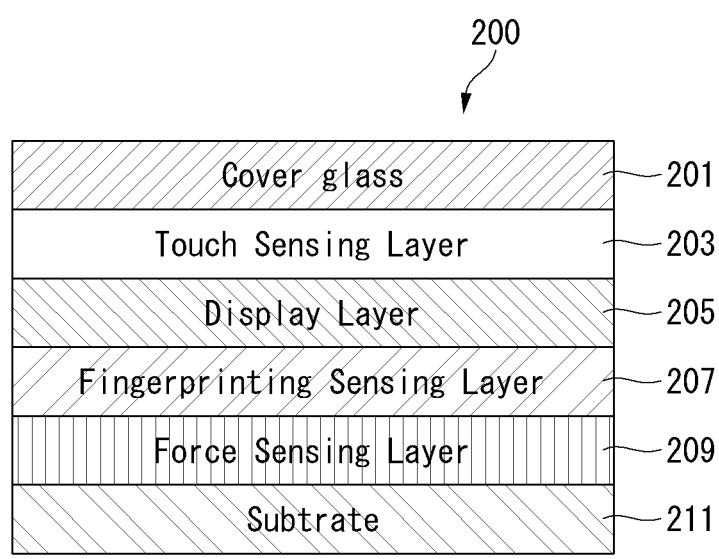
FIG. 2 is a diagram for describing an example of a display stack structure according to an embodiment of the present invention.

Cover glass 201 at the top of a display stack 200 shown in FIG. 2 may correspond to the display unit 151 of FIG. 1B. The cover glass 201 may be made of a transparent material, glass, plastic or sapphire and function as an interface for receiving a touch input from a user and sensing the strength of a touch input. A user can manipulate the cover glass 201 using one or more fingers or a stylus. Further, a touch sensing layer 203 can sense a touch input to the cover glass 201. A capacitive, optical, ultrasonic or resistive touch sensing technology may be applied to the touch sensing layer.

In addition, a display layer 205 may be implemented in various forms including an LCD, an LED display and/or an OLED display. The display layer 205 can also be made of glass or have a glass substrate. Further, the touch sensing layer 203 may be implemented in combination with the display layer 205. A polarization plate, a color filter layer, etc. can also be additionally disposed between the touch sensing layer 203 and the display layer 205.

A fingerprinting sensing layer 207 senses the fingerprint of a user through a touch input to the cover glass 201. The fingerprinting sensing layer 207 may be equipped with a fingerprint sensor. For example, the fingerprint sensor may be implemented using a capacitive fingerprint sensor, an ultrasonic sensor, an optical sensor or a pyro-electric sensor. The fingerprint sensor may also be implemented in a dielectric element of a button form separately from the display stack 200 and be implemented in such a way as to capture fingerprint information.

A force sensing layer 209 is used to determine or estimate the amount of a force applied to the cover glass 201. A technology for sensing a capacitive, ultrasonic and piezoelectric force may be applied to the force sensing layer 209. In accordance with an embodiment of the present invention, if both the fingerprint sensor and the force sensor are implemented using an ultrasonic sensing method, the fingerprinting sensing layer 207 and the force sensing layer 209 can sense the fingerprint of a user and the strength of a touch input at the same time using ultrasonic waves output by a single module.

In addition, a substrate layer 211 can form a support surface, such as a printed circuit board or a frame. The substrate layer 211 can also be configured to surround at least part of the sensors that form the touch sensing layer 203, the fingerprinting sensing layer 207, and the force sensing layer 209. As described above, the touch sensing layer 203 may include a touch sensor, the fingerprinting sensing layer 207 may include a fingerprint sensor, and the force sensing layer 209 may include a force sensor.

Figure 3:
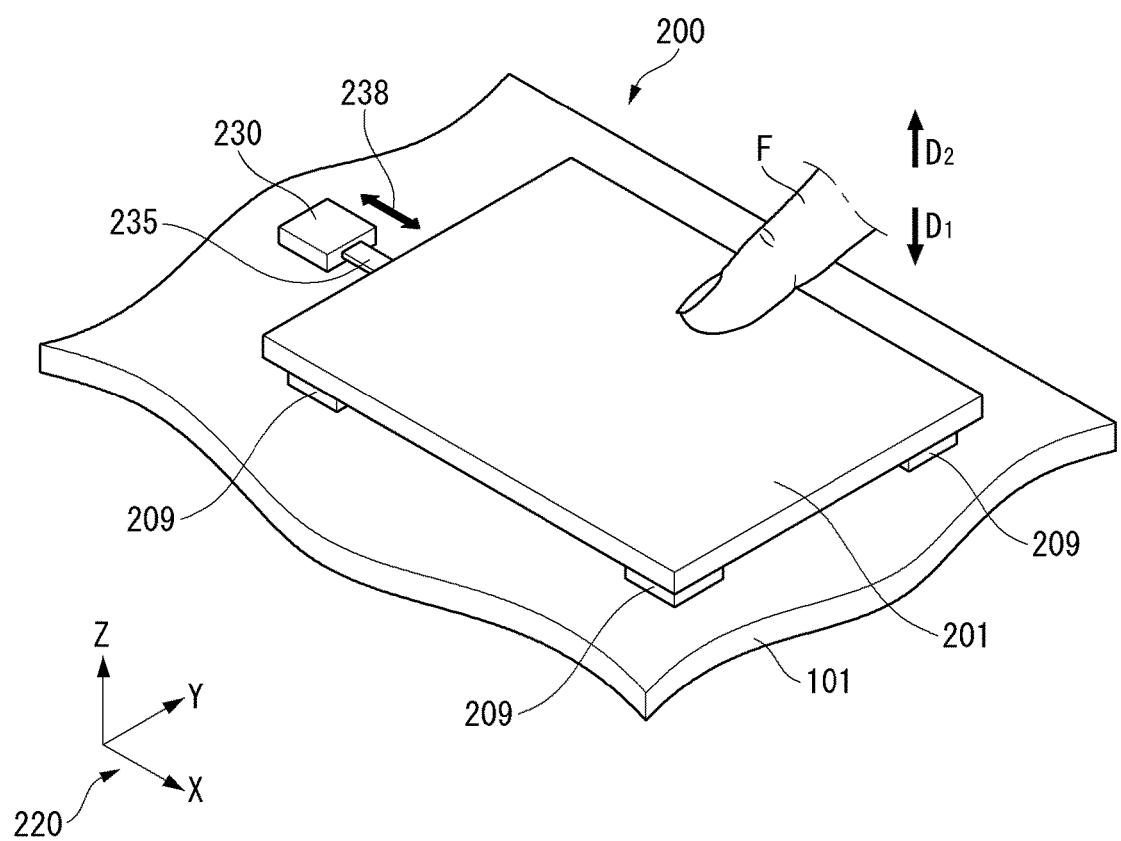
FIG. 3 is a perspective view of an exemplary display unit including a force sensor and a haptic module which provide haptic feedback according to an embodiment of the present invention.

FIG. 3 is a perspective view of an exemplary display unit including a force sensor and a haptic module which provide haptic feedback according to an embodiment of the present invention.

Referring to FIG. 3, the position of a user's finger F or an external object in the XY plane of the cover glass 201 may be sensed through a touch sensor (corresponding to the touch sensing layer of FIG. 2). The position of the finger F or the external object in the XY plane of the cover glass 201 may be measured through the touch sensor. In addition, downward D1 and upward D2 movement along the Z axis may be sensed through a force sensor.

The force sensor 209 can respond to a force vertically applied along the Z axis, in general. The display unit 200 may be supported by a housing 101 and combined with the at least one force sensor 209. For example, the force sensor 209 may be provided to a corner of the display unit 200 in a rectangular structure.

For example, when two force sensors 209 are applied, the force sensors 209 may be located at opposite edges of the underside of the cover glass 201. When four force sensors are applied, the force sensors may be located at the edges of the underside of the cover glass 201. When three force sensors 209 are applied, the force sensors may be arranged in a triangle under the cover glass 201. When one force sensor 209 is applied, the force sensor may be located at the center or an edge of the underside of the cover glass 201.

The number and arrangement form of force sensors 209 are not limited to the aforementioned example and may be modified in various manners. However, when the force sensors 209 are located at the four corners of the underside of the cover glass 201, force signals may be collected from the multiple force sensors 209 and processed in parallel.

When touch input of pressing downward D1 with a specific force is received, a haptic module (actuator) 230 may be controlled to output a haptic signal. When the haptic module 230 is driven by a control signal, the haptic module 230 drives an arm 235 in the direction of the cover glass 201 (e.g., horizontal direction 235 parallel with the X axis). Such a motion may be provided when the intensity of touch input applied to the cover glass 201 exceeds critical intensity, and predetermined vibration may be delivered to the user's finger due to the motion.

The vibration felt by the user may be defined as tactile feedback. When relatively insignificant vertical movement in the cover glass 201 is sensed, the user may feel as if the cover glass 201 moves downward and is engaged with a general mechanical switch because the cover glass 201 is mounted on the housing which is substantially fixed.

The at least one force sensor 209 shown in FIG. 3 may be attached to the housing 101 using a predetermined adhesive. Although only the cover glass 201 and the force sensor 209 in the display stack structure illustrated in FIG. 2 are shown and described in FIG. 3 for convenience of description, at least one layer structure may be provided between the cover glass 201 and the force sensor 209.

The force sensor according to an embodiment of the present invention includes the concept of ultrasonic based force sensing.

Figure 4A:
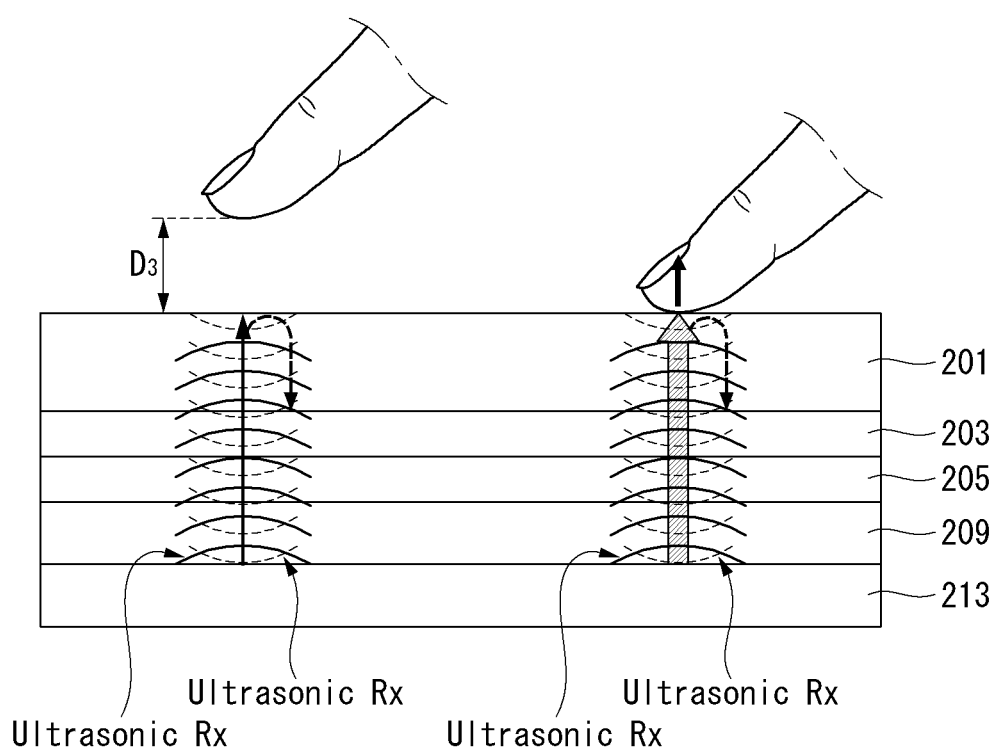
FIGS. 4A and 4B are diagrams for describing the concept of ultrasonic based force sensing according to an embodiment of the present invention.
Figure 4B:
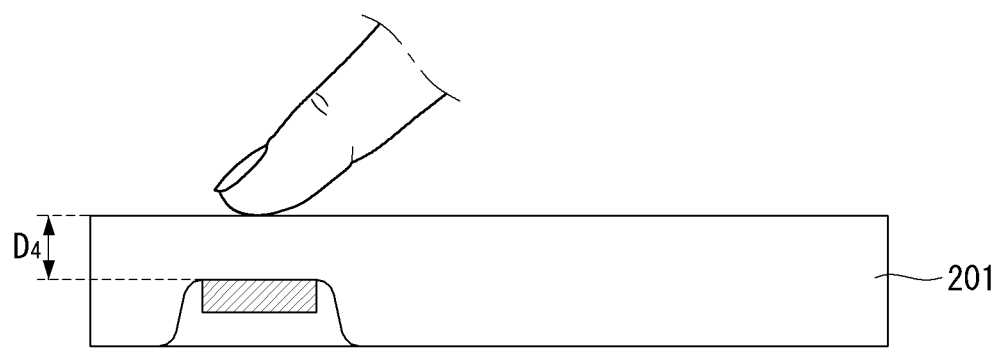

FIGS. 4A and 4B are diagrams for describing the concept of ultrasonic based force sensing according to an embodiment of the present invention.

Referring to FIG. 4A, an ultrasonic based force sensor may include a transceiving unit 213 having a transmitter/receiver configured to emit ultrasonic pulses, to receive reflected ultrasonic pulses and to generate a signal in response to the reflected ultrasonic pulses.

When the ultrasonic based force sensor according to an embodiment of the present invention is used, intensity of touch input can be calculated by measuring the quantity of ultrasonic pulses reflected by a user's finger.

FIG. 4A illustrates at least part of the display stack shown in FIG. 3 in order to describe energy absorption and reflection in a process of transmitting ultrasonic pulses output from the transceiving unit 120 to the surface of the cover glass 201. For example, a description will be given using a stack structure including the cover glass 201, the touch sensing layer 203, the display layer 205, the force sensing layer 209 and the ultrasonic transceiving unit 213.

The transceiving unit 213 may include a piezoelectric material (not shown) which can emit an ultrasonic signal in response to current and generate current in response to an ultrasonic signal. The piezoelectric material can be used to transmit or receive an ultrasonic signal, and current generated using the piezoelectric material corresponds to the strength of a received signal.

Ultrasonic pulses are generated by the transceiving unit 213 and emitted toward the surface of the cover glass 201 (Ultrasonic Tx). At least part of the energy of ultrasonic pulses is reflected at the interface of each layer and the remaining part thereof is delivered to the next layer. The quantity of energy reflected at the interface of each layer and the quantity of energy delivered at the interface of each layer may depend on properties of each layer. The pulse signal output from the transceiving unit 213 is transmitted to the surface of the cover glass 201 through at least one of the aforementioned layers 209, 205, 203 and 201, and the quantity (Ultrasonic Rx) of reflected ultrasonic pulses may be determined according to whether a user's finger contacts the cover glass 201.

For example, when the user's finger does not contact the cover glass 201 (the user's finger is positioned a predetermined distance D3 from the surface of the cover glass 201), almost all of the energy of ultrasonic pulses (Ultrasonic Tx) output from the transceiving unit 213 and transmitted to the cover glass 201 is reflected by the interface between the cover glass 201 and air. Energy loss occurs while the reflected ultrasonic pulses are returned to the transceiving unit 213. In this case, about 7% of energy of the ultrasonic pulses output from the transceiving unit 213 is returned to the transceiving unit 213.

In a case in which the user's finger contacts the cover glass 201, when the ultrasonic pulses (Ultrasonic Tx) output from the transceiving unit 213 arrive at the cover glass 201, about 70% of energy thereof is absorbed by the user's finger and about 30% of the remaining energy is reflected. In this case, the percentage of ultrasonic pulses finally reflected by the interface between the cover glass 201 and air among the ultrasonic pulses output to the cover glass 201 may be determined by various factors. For example, the quantity of reflected ultrasonic pulses may be determined by a force of the finger pressing the cover glass 201, the amount of wetting of the cover glass 201 due to the user's finger, and heat caused by the user's finger. Accordingly, the ultrasonic force sensor can sense intensity of touch input through the quantity of finally reflected ultrasonic pulses.

That is, when the ultrasonic force sensor is used, it is possible to measure intensity of touch input more accurately by generating a force signal in which even noise due to humidity between the user's finger and the cover glass has been reflected.

Referring to FIG. 4B, it is possible to provide a sensing element for force sensing and/or fingerprint sensing inside of the cover glass 201 instead of employing the display stack as shown in FIG. 4A. That is, the display stack structure may be modified such that a distance D4 between a user's finger and the sensing element included in the cover glass is minimized to obtain a more accurate sensing result.

While FIG. 4A illustrates an example of implementing the force sensor using ultrasonic pulses, the present invention may apply ultrasonic pulses to a fingerprint sensor.

Figure 5:
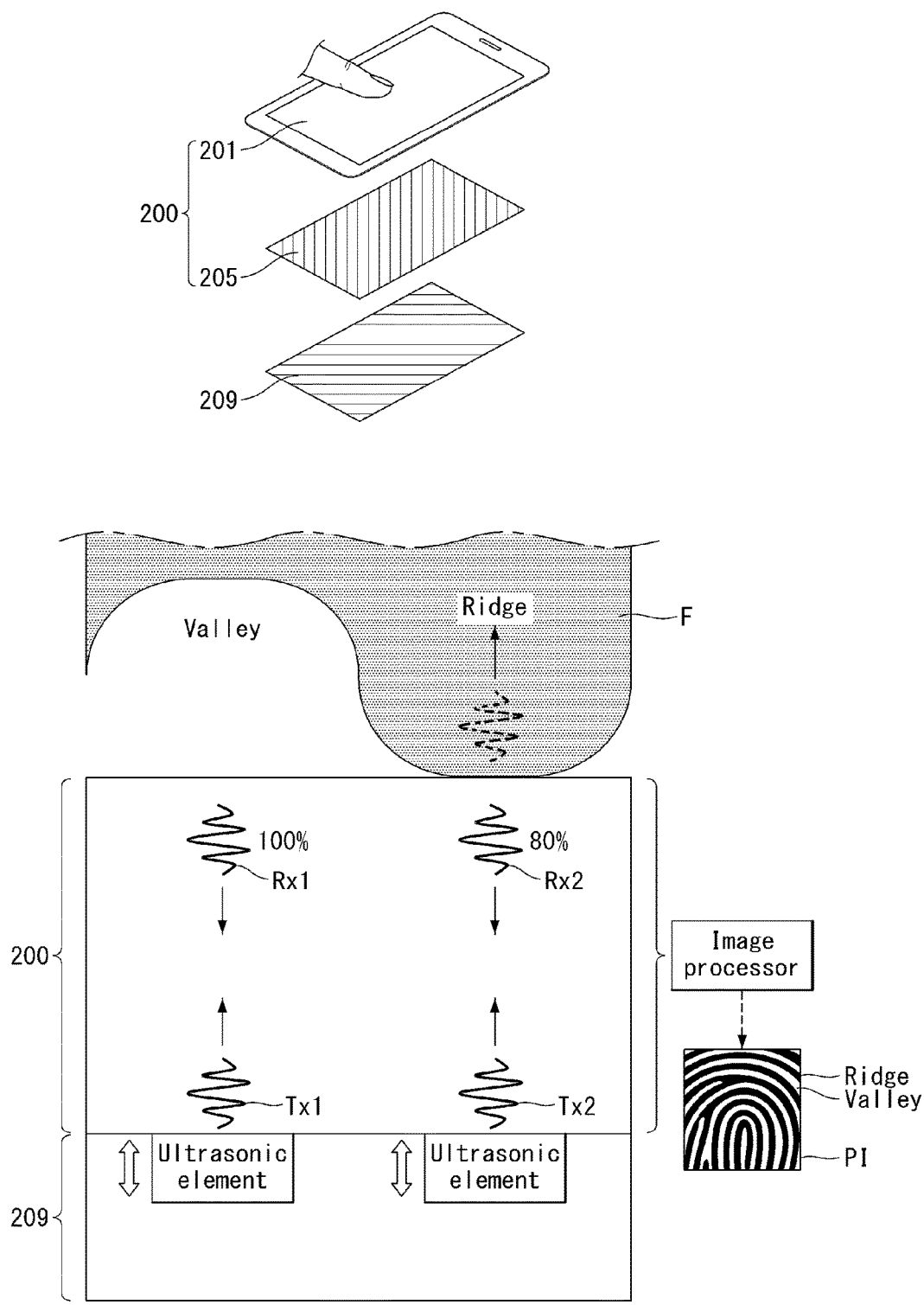
FIG. 5 is a diagram for describing the concept of ultrasonic based fingerprint sensing according to an embodiment of the present invention.

FIG. 5 is a diagram for describing the concept of ultrasonic based fingerprint recognition according to an embodiment of the present invention.

Referring to FIG. 5, the force sensing layer 209 includes a piezoelectric element (ultrasonic element). When the piezoelectric element outputs ultrasonic pulses TX1 and TX2 toward the cover glass 201, fingerprint recognition may be performed by image-processing an ultrasonic reflectivity difference between a valley region and a ridge region of a fingerprint. That is, 100% of the first ultrasonic pulse signal TX1 output toward the valley region may be reflected RX1, whereas 20% of the second ultrasonic pulse signal TX2 output toward the ridge region may be absorbed by the user's finger and 50% thereof may be reflected RX2. An image processor may generate a fingerprint image PI having valleys and ridges distinguished from the valleys on the basis of the quantity of energy of reflected ultrasonic pulses.

According to embodiments of the present invention, it is possible to sense touch intensity and/or touch intensity variation using a force sensor and to authenticate a user using a fingerprint sensor. Force sensing and/or fingerprint sensing may be performed using the sensing methods described with reference to FIGS. 4A to 5. However, force sensing and fingerprint sensing methods are not limited to the above-described examples and may be modified in various manners. As described above, force sensing and fingerprint sensing can be simultaneously performed using the ultrasonic sensor. Accordingly, it is possible to increase sensing efficiency while minimizing the space occupied by the sensing unit in the housing of the mobile terminal.

A description will be given of operations of the mobile terminal according to the embodiments of the present invention described above with reference to FIGS. 1A to 5.

Figure 6:
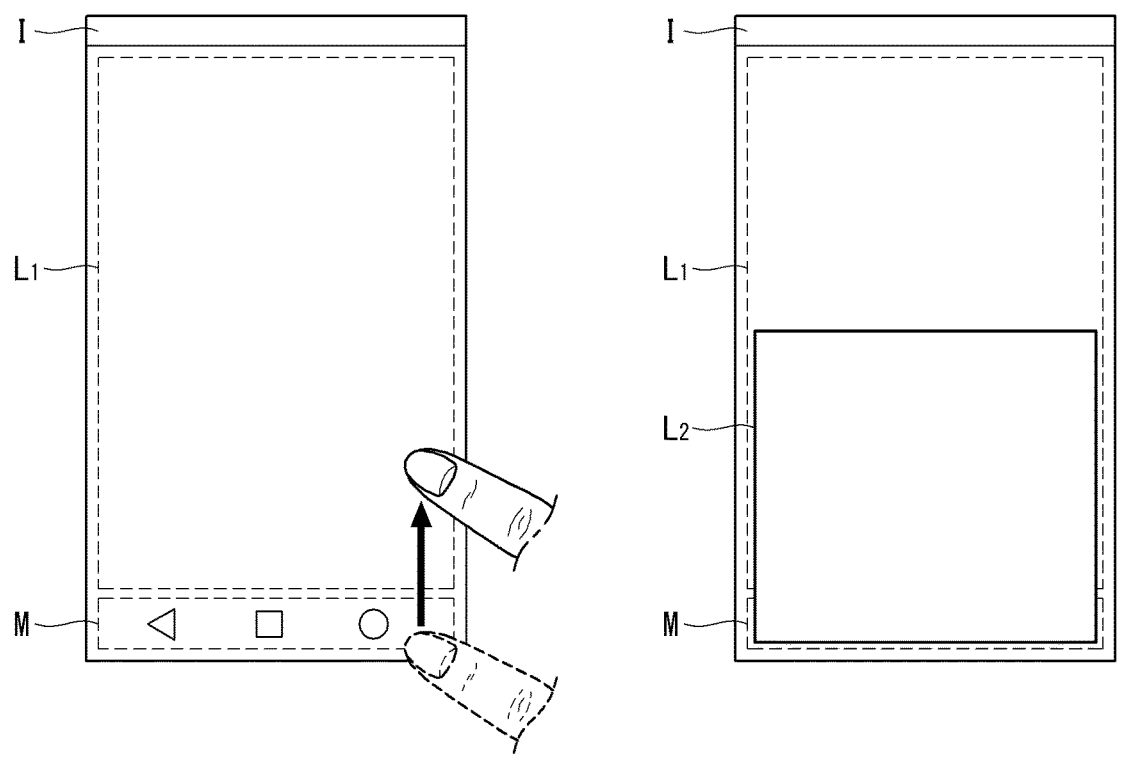
FIGS. 6 and 7 are conceptual views for describing an example of applying a method of controlling a mobile terminal according to an embodiment of the present invention using a plurality of layers.
Figure 7:
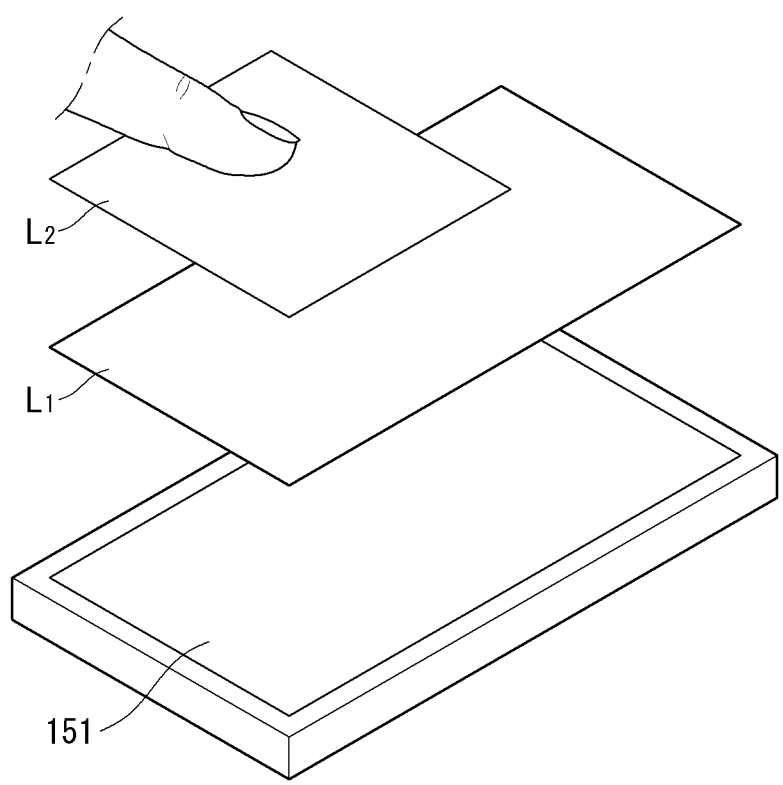

FIGS. 6 and 7 are conceptual views for describing an example of applying a method of controlling the mobile terminal according to an embodiment of the present invention using a plurality of layers.

According to an embodiment of the present invention, an interface for force sensing and/or fingerprint sensing may be the touchscreen (151 of FIG. 1B) or the cover glass (201 of FIGS. 2 to 5). The following description will be based on the assumption that an element for receiving touch input of a user is the touchscreen 151 for convenience of description.

The entire area of the touchscreen 151 may be an area for sensing intensity of touch input through touch input or performing fingerprint recognition. An additional area may be provided for force sensing and/or fingerprint sensing on the touchscreen 151.

Referring to FIG. 6, a first layer L1 may be displayed in the entire area of the touchscreen 151. The first layer L1 may display at least one application icon, widget icon, application execution screen, home screen, etc. The home screen is an initial screen displayed on the touchscreen 151 when the mobile terminal 100 is started and may display at least one application executable in the mobile terminal 100. The home screen may be composed of at least one page and may sequentially display a plurality of pages on the touchscreen 151 according to input such as flicking. Execution of a graphical object displayed in the first layer L1 may be controlled through touch input applied to the graphical object.

A control region M may be displayed in the lower area of the touchscreen 151 and may display at least one control key (a back key, a home key, a key for providing an application being executed, etc.) for controlling a view displayed on the touchscreen 151.

According to an embodiment of the present invention, while force sensing and/or fingerprint sensing may be performed in a state in which only the first layer L1 is provided, force sensing and/or fingerprint sensing may be controlled to be performed through a second layer L2 discriminated from the first layer L1.

The controller 180 may provide the second layer L2 upon reception of touch input having a predetermined pattern applied to the bottom edge of the touchscreen 151.

The touch input having a predetermined pattern may include swipe input from the bottom edge of the touchscreen 151 to the center of the touchscreen 151 or swipe input applied to the control region provided to the lower area of the touchscreen 151.

The second layer L2 may be displayed to overlap with a lower part of the first layer L1 which ranges from the bottom edge of the first layer L1 to a predetermined height.

Furthermore, when the second layer L2 is displayed, the controller 180 may control display of the first layer L1 and the second layer L2 such that the first layer L1 and the second layer L2 are displayed with different display characteristics. For example, when the second layer L2 is displayed on the touchscreen 151, the brightness of the first layer L1 may be decreased or the first layer L1 may be blurred to enhance relative visibility of the second layer L2.

Referring to FIG. 7, when the second layer L2 is displayed, it is possible to control the view displayed on the first layer according to force touch and/or fingerprint authentication by performing force touch and/or fingerprint authentication through the second layer L2 according to an embodiment.

Meanwhile, the first layer L1 and the second layer L2 shown in FIG. 7 are displayed in such a manner that at least parts thereof overlap in the same plane but they do not form a stack structure.

However, even if the first layer L1 and the second layer L2 are simultaneously displayed in the same plane, they may be functionally separated and may independently operate. For example, when touch input is applied to a lower area of the touchscreen 151 in which the first layer L1 and the second layer L2 overlap in a state in which the second layer L2 is activated in FIG. 6, the touch input may be determined as input applied to the second layer L2.

For example, when the controller 180 controls one of the first layer L1 and the second layer L2 to be activated in a state in which the first layer L1 and the second layer L2 are simultaneously displayed, received touch input may be applied to the activated layer. For example, when only the first layer L1 is activated in a state in which the first layer L1 and the second layer L2 are displayed in an overlapping manner, the controller 180 may control the first layer L1 to respond to the touch input applied to the overlapping area.

Figure 8:
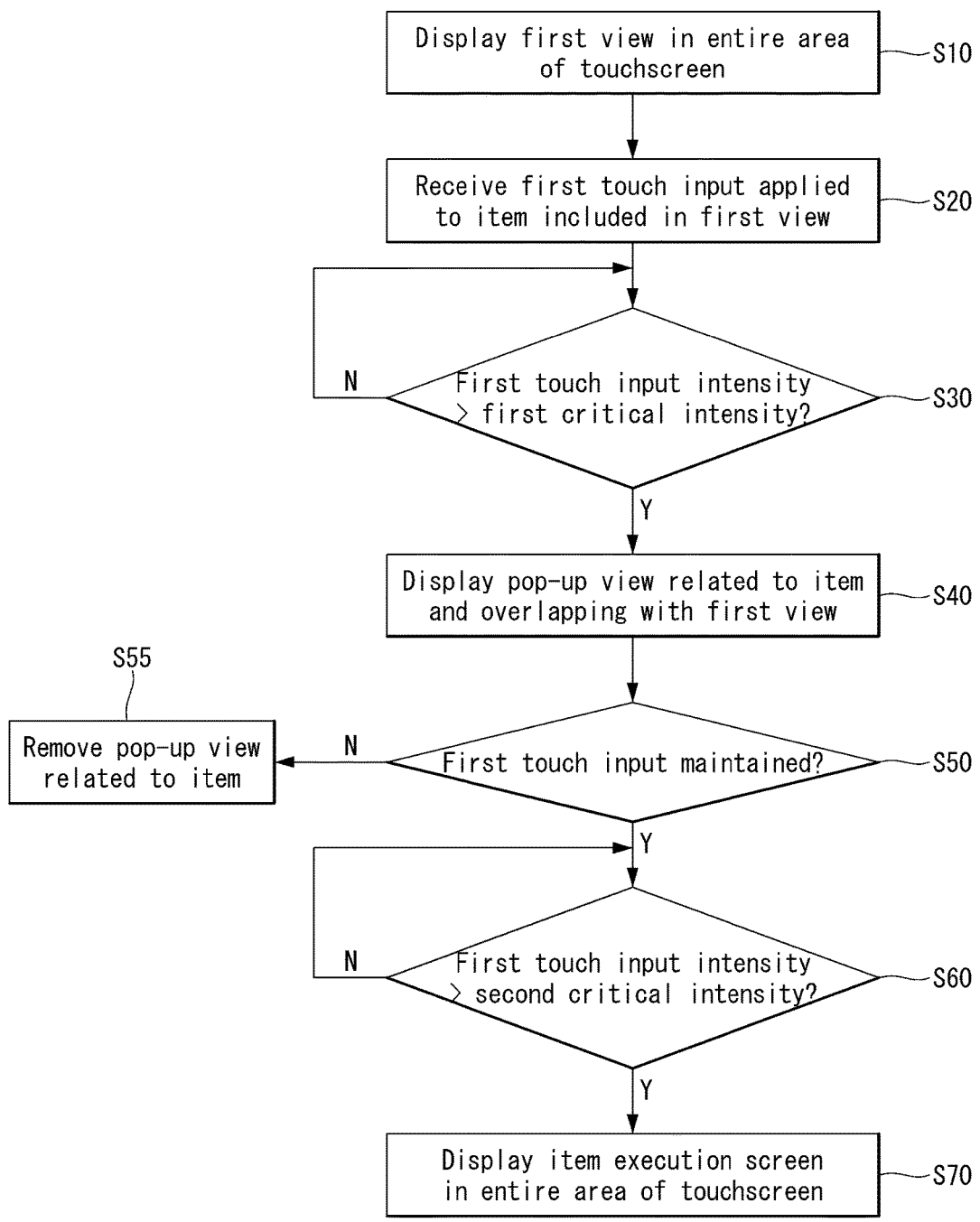
FIG. 8 is a flowchart illustrating an example of controlling a graphical object through force touch input in order to apply the method of controlling a mobile terminal according to an embodiment of the present invention.
Figure 9A:
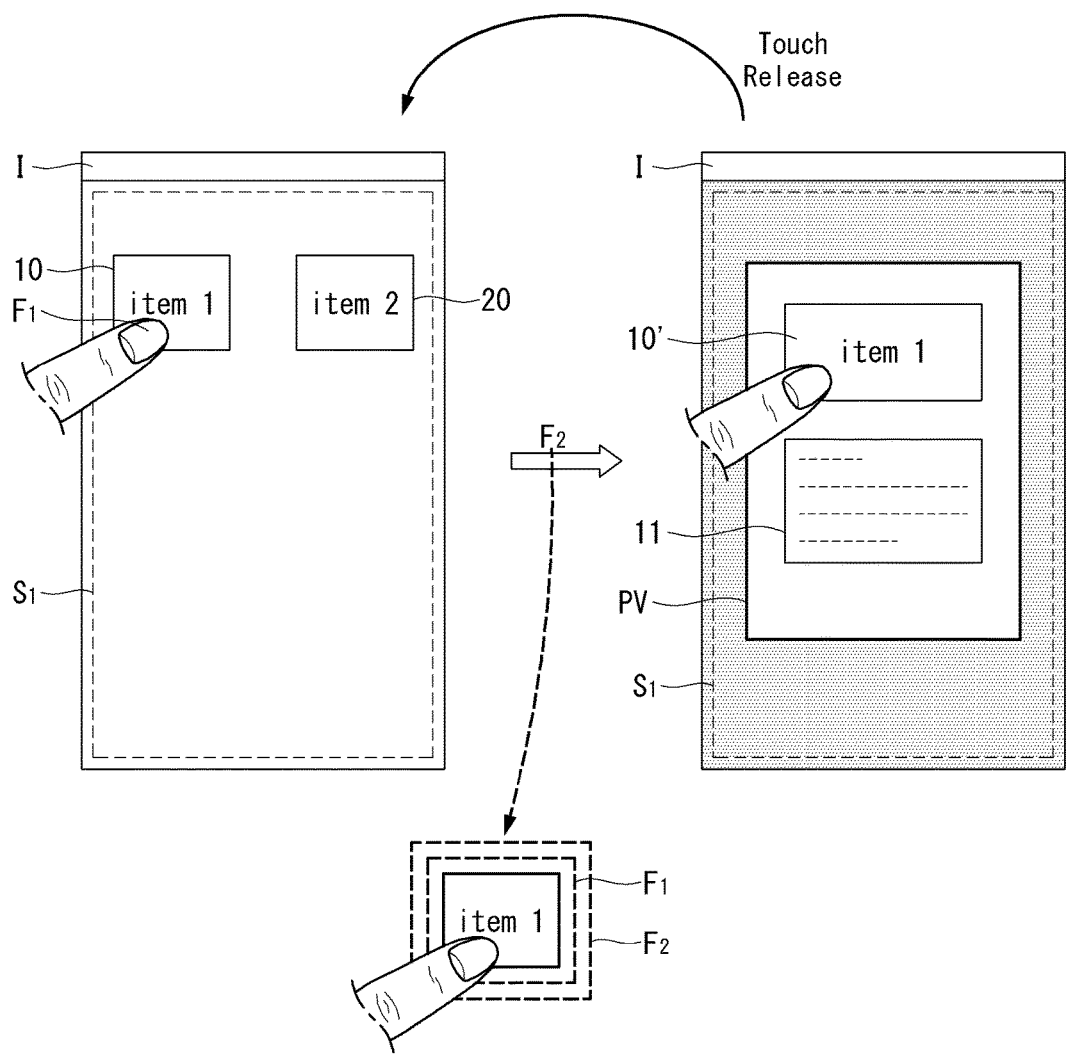
FIGS. 9A and 9B illustrate exemplary screen compositions for describing the flowchart shown in FIG. 8.
Figure 9B:
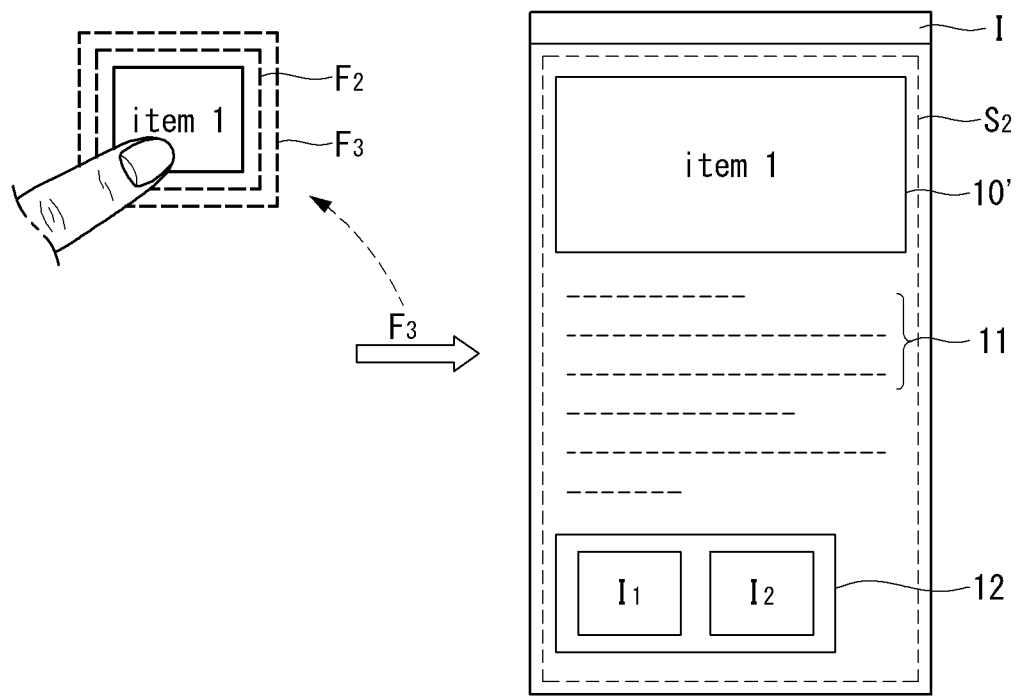

FIG. 8 is a flowchart illustrating an example of controlling a graphical object through force touch input in order to apply the method of controlling a mobile terminal according to an embodiment of the present invention and FIGS. 9A and 9B illustrate exemplary screen compositions for describing the flowchart shown in FIG. 8. The method of controlling a mobile terminal according to an embodiment of the present invention may be implemented in the mobile terminal 100 described above with reference to FIGS. 1A to 5.

Referring to FIG. 8, the controller 180 may display a first view in the entire area of the touchscreen 151 (S10).

The controller 180 may receive first touch input applied to an item included in the first view (S20). The controller 180 may sense touch intensity of the first touch input through the force sensor (142 of FIG. 1A).

The controller 180 may provide a pop-up view related to the item to the touchscreen 151 (S40) when the intensity of the first touch input exceeds a first critical intensity (S30: YES).

The force sensor may monitor gradual increase in force applied from the start time of the first touch input and the controller 180 may display the pop-up view on the touchscreen 151 when the increasing force exceeds the first critical intensity.

The controller 180 may provide the pop-up view while the first touch input is maintained (S50) and remove the pop-up view from the touchscreen 151 when the first touch input is released (S55).

The pop-up view may be displayed such that the pop-up view overlaps with at least part of the first view while the first view is displayed. The controller 180 may change display characteristics of the first view (e.g., blur the entire area of the first view) when the pop-up view is displayed to improve relative visibility with respect to the pop-up view. The display characteristics of the first view may be returned to the previous state simultaneously with removal of the pop-up view.

Upon detecting that the intensity of the first touch input sensed through the force sensor changes to a second critical intensity higher than the first critical intensity while the first touch input and display of the pop-up view are maintained (S60: YES), the controller 180 may display an execution screen of the item in the entire area of the touchscreen 151 (S70).

That is, when touch intensity applied to the item included in the first view exceeds the first critical intensity, the execution screen of the item instead of the first view may be displayed on the touchscreen 151. When normal touch input (touch reception and touch release) instead of force touch is received for the item, the pop-up view is not displayed and the execution screen of the item may be directly displayed on the touchscreen 151.

Referring to FIG. 9A, the controller 180 may display a first view S1 including a first item 10 and a second item 20 on the touchscreen 151.

The controller 180 may detect intensity and/or intensity variation of the first touch input applied to the first item 10 through a force sensor for the first item 10. For example, when the first touch input applied to the first item 10 is maintained having a first intensity F1, the controller 180 may not respond to the first touch input. However, upon detecting that the first intensity F1 increases to a second intensity F2 (the first critical intensity), the controller 180 may display a pop-up view PV associated with the first item 10 in such a manner that the pop-up view PV and at least part of the first view S1 overlap.

The pop-up view PV may be a preview view of a view provided when the first item 10 is executed. Accordingly, an image 10' and other types of information 11 related to the first item may be displayed together. Here, when the first touch input is released, the controller 180 may remove the pop-up view PV.

When the first touch input is not released while the pop-up view PV is displayed and drag input applied to the pop-up view PV is received while the first touch input maintained, the pop-up view PV may be moved in the direction of the drag input.

In addition, the controller 180 may improve visibility of the pop-up view PV by blurring the first view S1.

Referring to FIG. 9B, when the intensity of the first touch input exceeds a third intensity F3 (the second critical intensity) beyond the second intensity while the first touch input is continuously maintained, the execution screen S2 (second view) of the first item 10 may be directly displayed on the touchscreen 151.

It can be known from FIGS. 9A and 9B that a view displayed on the touchscreen 151 is changed when intensity of touch input of the user exceeds a critical intensity. That is, when touch input applied to the first item 10 on the first view exceeds the first critical intensity, the pop-up view PV associated with the first item 10 is displayed while display of the first view is maintained. In this state, the first view changes to the second view when the touch input exceeds the second critical intensity.

However, view transition may not be applied to all items when intensity of force touch exceeds a critical intensity. Furthermore, the number of times of view transition may be limited even if view transition occurs for a specific item through force touch. For example, for a specific application icon having view transition occurring in stages according to force touch input, when the last stage in which view transition through force touch no longer occurs is reached after view transition through a plurality of force touches, feedback may need to be output such that a user can recognize the view of the last stage.

A description will be given of embodiments of outputting feedback in a state in which the last stage, in which view transition occurs according to force touch, is reached according to a first embodiment.

Figure 10:
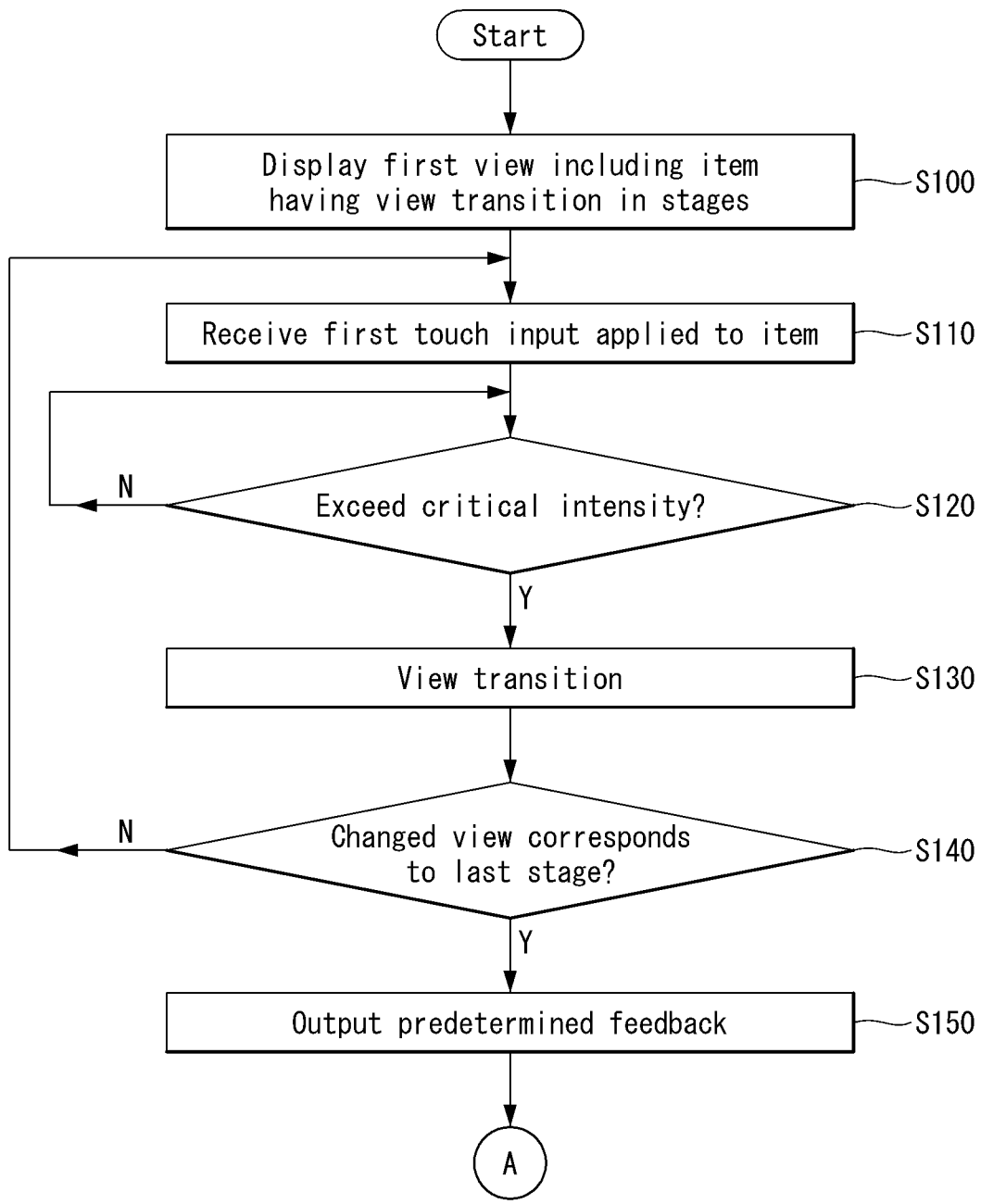
FIG. 10 is a flowchart illustrating a method of controlling a mobile terminal according to a first embodiment of the present invention.
Figure 11:
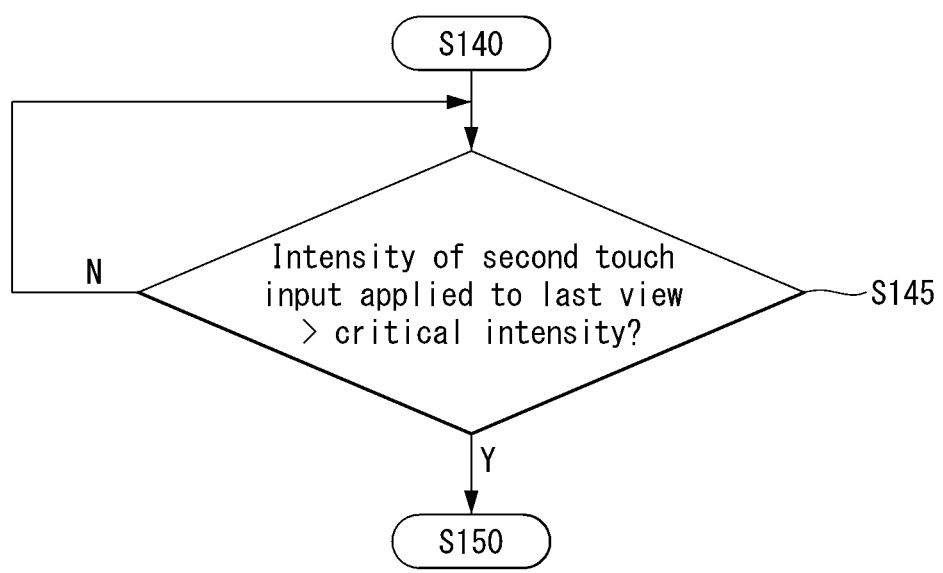
FIG. 11 is a flowchart illustrating a method of controlling a mobile terminal according to a modified example of the first embodiment of the present invention.

FIG. 10 is a flowchart illustrating a method of controlling a mobile terminal according to the first embodiment of the present invention and FIG. 11 is a flowchart illustrating a method of controlling a mobile terminal according to a modified example of the first embodiment of the present invention. FIG. 12 is a diagram for describing the concept of a last stage view according to force touch input according to the first embodiment of the present invention and FIGS. 13 to 16B are diagrams for describing the first embodiment of the present invention.

The method of controlling a mobile terminal according to the first embodiment of the present invention may be implemented in the mobile terminal described above with reference to FIGS. 1A to 5. A description will be given of the method of controlling a mobile terminal according to the first embodiment of the present invention and operations of the mobile terminal 100 to implement the same with reference to the attached drawings.

Referring to FIG. 10, the controller 180 may display a first view including an item having view transition occurring in stages on the touchscreen 151 (S100).

The item having view transition occurring in stages may refer to an item having at least one depth in execution of the item.

For example, a first view related to the item can be provided when first touch input is applied to the item, a second view different from the first view can be provided when second touch input is applied to the first view, and a third view different from the second view can be provided when third touch input is applied to the second view.

In this case, although all of the first view, the second view and the third view are associated with the item, the second view can include a larger amount of information than the first view with respect to the item, and the third view may include a larger amount of information than the first view and the second view with respect to the item.

In addition, the first to third touch inputs may be independent touch inputs.

Alternatively, the first to third touch inputs may be independent force touch inputs having the same touch intensity.

Alternatively, the first to third touch inputs may be successive touch inputs having gradually changing touch intensity while the first touch input is maintained.

The item having view transition occurring in stages will be described in more detail with reference to FIG. 12.

The controller 180 may receive first touch input applied to the item (S110).

The first touch input may be touch input to which the aforementioned force touch is applied and which has touch intensity that gradually changes (e.g., increases) with the time from first touch input detection time.

In the specification, touch input may be divided into normal touch input and force touch input.

The normal touch input may include at least one of touch input which is released within a predetermined time after application (e.g., short touch input) and touch input which is maintained for a predetermined time or longer with touch intensity lower than predetermined intensity after application (e.g., long touch input).

The force touch input may refer to touch input having touch intensity which exceeds the predetermined intensity within a predetermined time after application of touch and thus a force signal is detected by a force sensor.

In the specification, the first touch input and the second touch input may be used as touch input to which force touch is applied.

The controller 180 may determine whether touch intensity of the first touch input increases to exceed a critical intensity (S120).

The critical intensity may refer to intensity for changing views in association with a touched item. When the touch intensity of the first touch input gradually increases but does not exceed the critical intensity, this may mean that view transition cannot occur with respect to the item in response to the first touch input.

Upon determining that the touch intensity of the first touch input exceeds the critical intensity (S120: YES), the controller 180 may control a view associated with the item to change to another view (S130).

The controller 180 may output a haptic signal whenever view transition occurs. That is, the controller 180 may control the haptic module to output a haptic signal simultaneously with view transitions with respect to the item when the intensity of the first touch input exceeds the critical intensity. The haptic module transmits a control signal for vibrating the display unit connected through the arm 235 in the horizontal direction to the touchscreen 151, as described above with reference to FIG. 3, such that a user's finger contacting the touchscreen 151 can be sensed.

The controller 180 may determine whether the changed view is the view of the last stage (S140). When the changed view is the view of the last stage (S140: YES), the controller 180 may output a predetermined feedback signal (S150).

That is, the controller 180 may display the last view and simultaneously output the feedback signal when the changed view is the last view. In this case, the controller 180 may confirm that a view to be changed in a view transition process is the last view and simultaneously perform display of the last view and output of the feedback signal.

Referring to FIG. 11, the controller 180 may receive additional touch input (second touch input) applied to the changed view after the changed view is displayed on the touchscreen 151 and determine whether touch intensity of the second touch input exceeds the critical intensity (S145) in the process of determining whether the changed view is the last view in FIG. 10.

The controller 180 may output the predetermined feedback upon determining that the touch intensity of the second touch input exceeds the critical intensity (S150).

The predetermined feedback may be a vibration pattern according to the haptic module.

Alternatively, the predetermined feedback may be display of one or more thumbnail images corresponding to one or more views associated with the item, which are sequentially displayed before the last stage, on the touchscreen 151.

In addition, the predetermined feedback may be applied differently depending on types of content included in the last view. For example, when content included in the last view is text, the predetermined feedback may be applying a different text selection range. For example, when content included in the last view is a still image, the predetermined feedback may include a process of zooming in on the still image.

A description will be given of a process of determining the last stage with respect of an item having view transition in stages according to one embodiment of the present invention with reference to FIG. 12.

Referring to FIG. 12, a first item to which touch input is applied may be a graphical object (icon) corresponding to the first item or a page related to the first item.

When first force touch F1 is applied to the first item (item 1) and the touch intensity TF of the first force touch exceeds a critical intensity TF1 at a time t1, a view related to the first item (item 1) may proceed to a first stage and switch to a first view (item 1A).

When second force touch F2 is applied to the displayed first view (item 1A) and the touch intensity TF of the second force touch exceeds the critical intensity TF1 at a time t3, the controller 180 may determine whether there is a view additionally switched from the first view (item 1A). When there is a view additionally switched from the first view (item 1A), the view related to the first item (item 1) may proceed to a second stage and switch to a second view (item 1B).

When third force touch F3 is applied to the displayed second view (item 1B) at a time t4 and the touch intensity TF of the third force touch exceeds the critical intensity TF1 at a time t5, the controller 180 may determine that the second view (item 1B) as a view of the last stage related to the first item when there is no view additionally switched from the second view (item 1B).

In addition, prior to determining whether there is a view additionally switched from the second view (item 1B), the controller 180 may display a third view on the touchscreen in response to the third force touch, and when the third view is determined to be identical to the second view, determine the second view as the view of the last stage related to the item.

The first item (item 1) may include at last one of text, a moving image and a graphical object.

The first view including the first item (item 1) may be a webpage including link information (e.g., URL information) used to proceed to the next stage. Furthermore, the first view may include data path information used to proceed to the next stage, for example.

That is, in FIG. 12, item 1, item 1A and item 1B may be items which have the same webpage as a source and partially share URL information. Alternatively, item 1, item 1A and item 1B may be items having different webpages as sources and URLs which are connected.

A description will be given of an example in which force touch according to an embodiment of the present invention is applied to a webpage including a predetermined image.

The controller 180 may display a first view S1 (first webpage) including at least one item (at least one of text, a still image and a moving image) on the touchscreen 151.

The controller 180 may receive first force touch F1 applied to media content 10 from among the at least one item.

The media content 10 may be moving image content provided through a first webpage. When normal touch input is applied to the media content 10, the webpage providing the media content may be directly displayed on the touchscreen 151. However, when the touch intensity of the first force touch F1 applied to the media content 10 exceeds a predetermined first critical intensity, a pop-up view PV providing a preview may be displayed such that the pop-up view PV overlaps with at least part of the first webpage. In this case, the first webpage may be blurred.

The controller 180 may receive second force touch F2 additionally applied to the media content 10 displayed in the pop-up view PV, removes the pop-up view PV from the touchscreen 151 when the touch intensity of the second force touch F2 exceeds a predetermined second critical intensity, and display a webpage S2 (second view) providing the media content in the entire area of the touchscreen 151.

Upon reception of third force touch F3 additionally applied to the media content displayed in the second view S2, the controller 180 may determine whether there is a view to be additionally switched in the second view S2.

Figure 14:

Referring to FIG. 14, when the second view S2 is the view of the last stage related to the media content 10, the controller 180 may output a haptic feedback signal HF.

Figure 13:
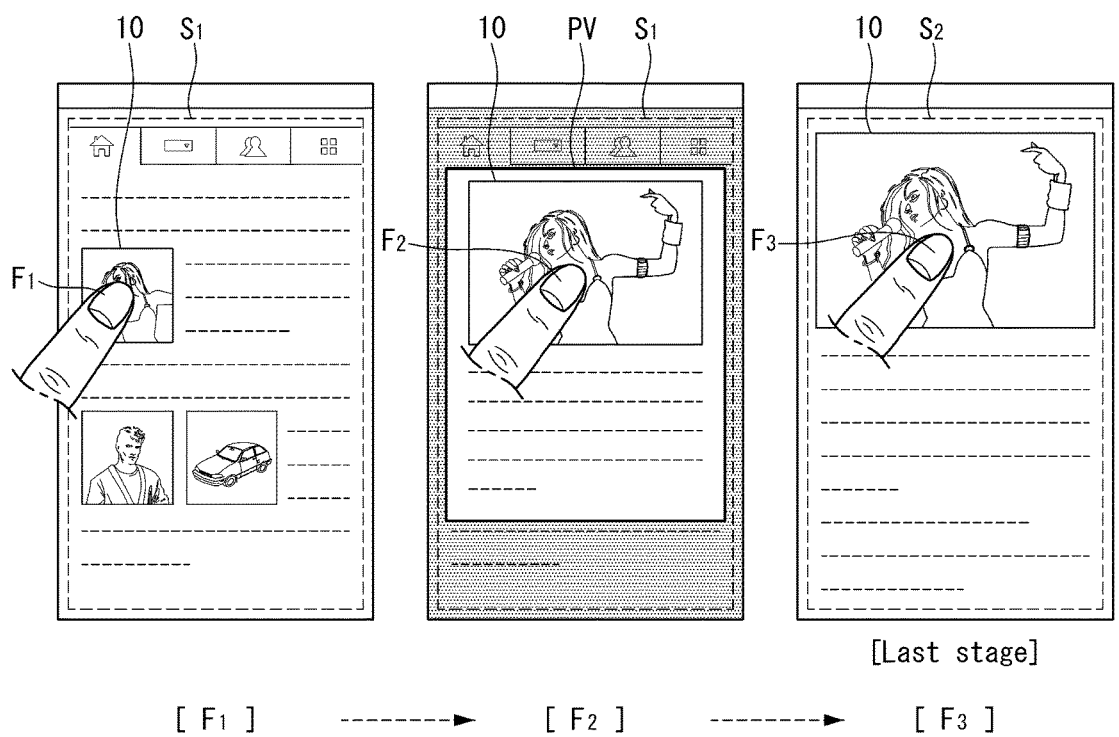
FIGS. 13 to 16B are diagrams for describing the first embodiment of the present invention.
Figure 15:
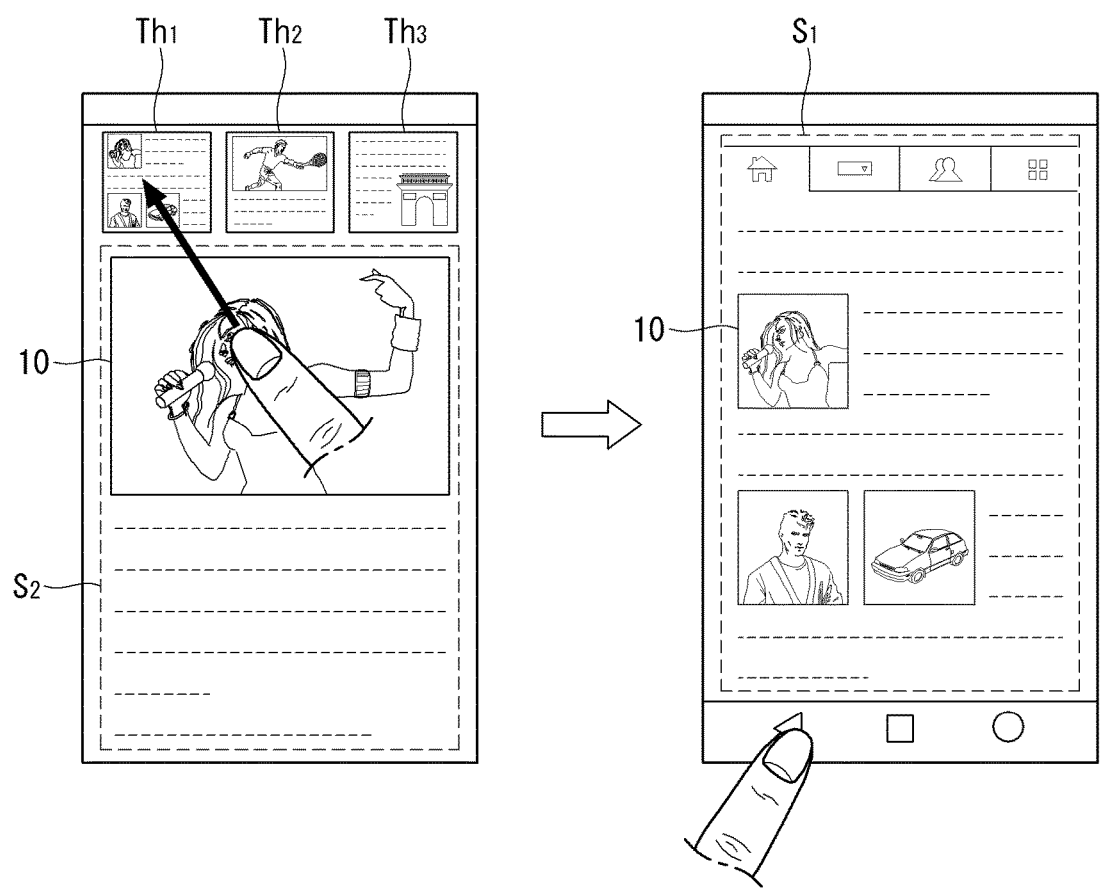

Referring to FIG. 15, upon reception of the third force touch F3 additionally applied to the second view S2 of the last stage shown in FIG. 13, the controller 180 may display, on the touchscreen 151, one or more thumbnails Th1, Th2 and Th3 corresponding to one or more views sequentially displayed prior to the last stage.

Upon reception of touch-and-drag input applied to the first thumbnail image Th1 with respect to the second view S2, the controller 180 may display the first webpage S1 corresponding to the first thumbnail image Th1.

When a back key is input for the first webpage S1, the controller 180 may display a view prior to the first webpage S1 on the touchscreen 151.

The thumbnail images may be displayed in the upper area or lower area of the touchscreen 151. When the thumbnail images are displayed, the user can intuitively recognize that there is no view for proceeding to the next stage.

Here, the view provided as thumbnail images may include one or more thumbnail images corresponding to different webpages having different web sources. The web sources may correspond to webpages.

Figure 16A:
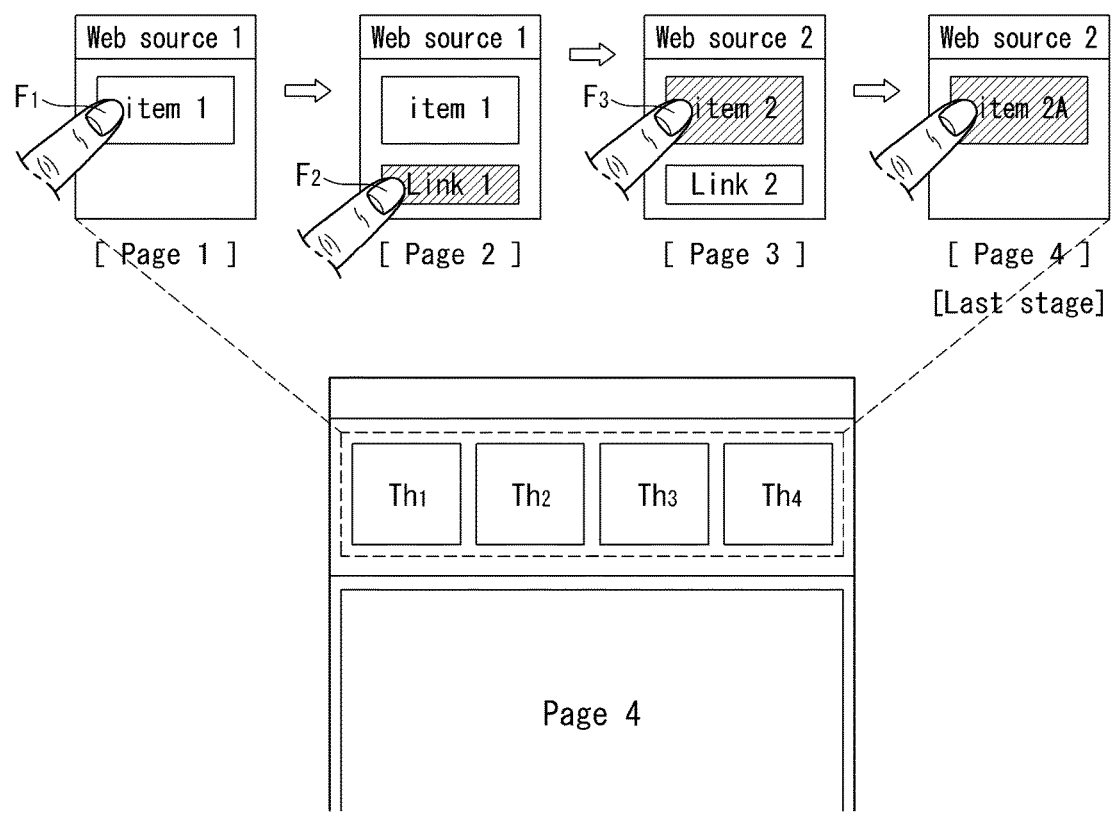

Referring to FIG. 16A, the controller 180 may display a first page provided by a first web source on the touchscreen.

When first force touch F1 applied to a first item included in the first page exceeds a critical intensity, a second page related to the first item may be displayed on the touchscreen.

The second page may include second item information linked to a second web source in addition to the first item. When second force touch F2 applied to the second item information Link 1 exceeds the critical intensity, the controller 180 may display a third page related to the second item on the touchscreen 151. The third page may be a page having a second webpage as a source. That is, the first webpage and the second webpage may be different webpages having URLs which do not have identical parts.

When third force touch F3 applied to the second item included in the third page exceeds the critical intensity, the controller 180 may display a fourth page related to the second item on the touchscreen 151. Upon determining that there is no view to be switched after the fourth page, the controller 180 may display thumbnail images Th1, Th2, Th3 and Th4 corresponding to the first to third pages before the fourth page on the touchscreen 151.

When the controller 180 receives touch-and-drag input of dragging touch applied to the fourth page to the first thumbnail image Th1, display may return to the first page corresponding to the first thumbnail image Th1. Here, although the fourth page has the second webpage as a source and the first page has the first webpage as a source, it is possible to access pages having different sources through a simpler method by providing thumbnail images in the last view accessible using force touch according to an embodiment of the present invention.

Figure 16B:
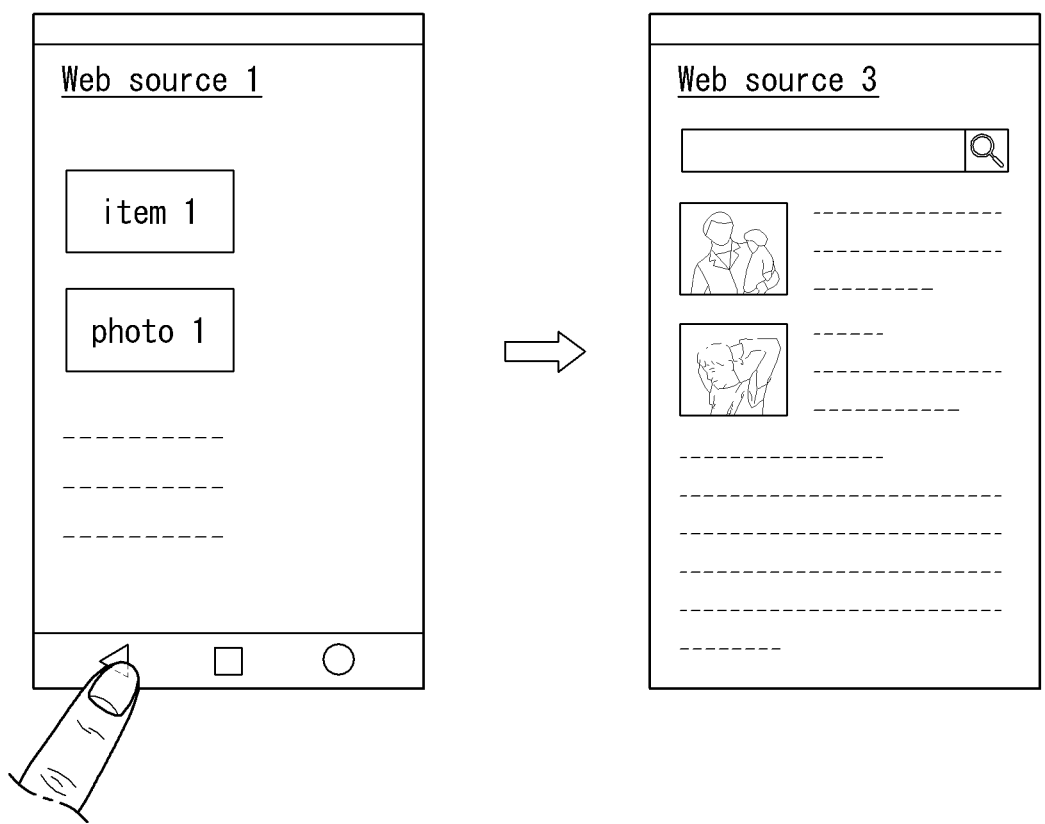

Referring to FIG. 16B, the controller 180 may access a page of the previous stage which is provided by a third web source upon reception of back key input after returning to the page provided by the first web source.

According to the first embodiment of the present invention, a feedback signal is output through an appropriate method in a state in which the last view is displayed through sequential force touch inputs applied to an item having view transition in stages, and thus the user can intuitively recognize the last view.

However, the present invention is not limited thereto. That is, when additional force touch input applied to the last view is received, a specific function may be executed in response to a plurality of force touch inputs additionally applied in addition to the operation of simply outputting feedback.

Figure 17A:
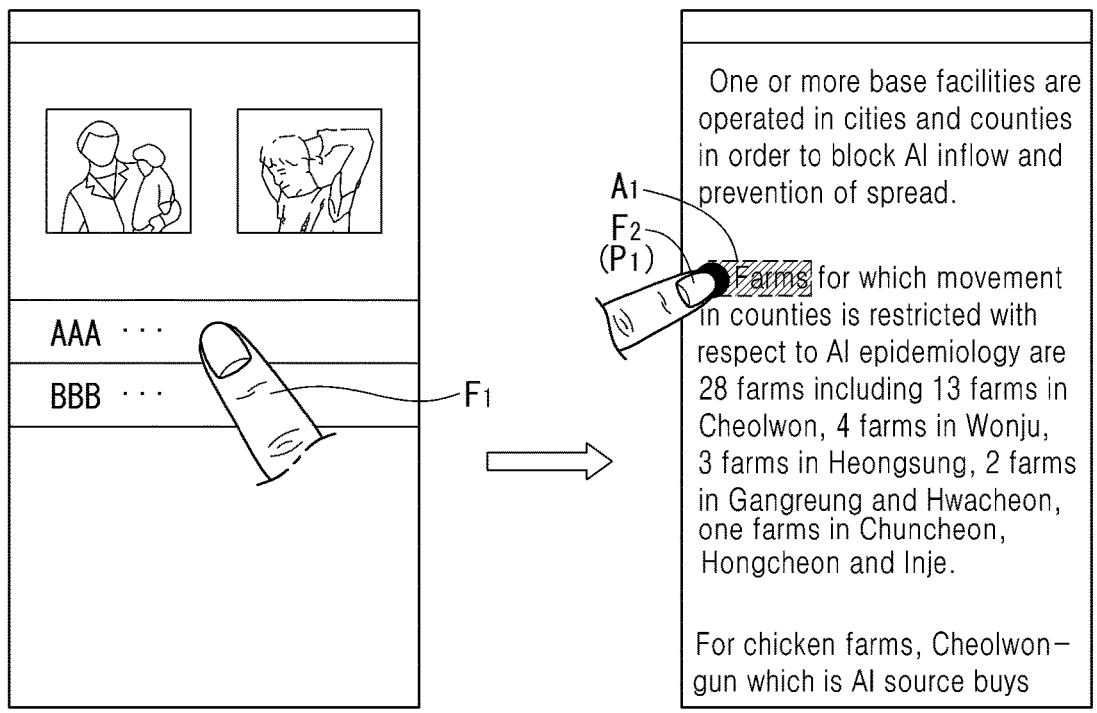
Figure 18:
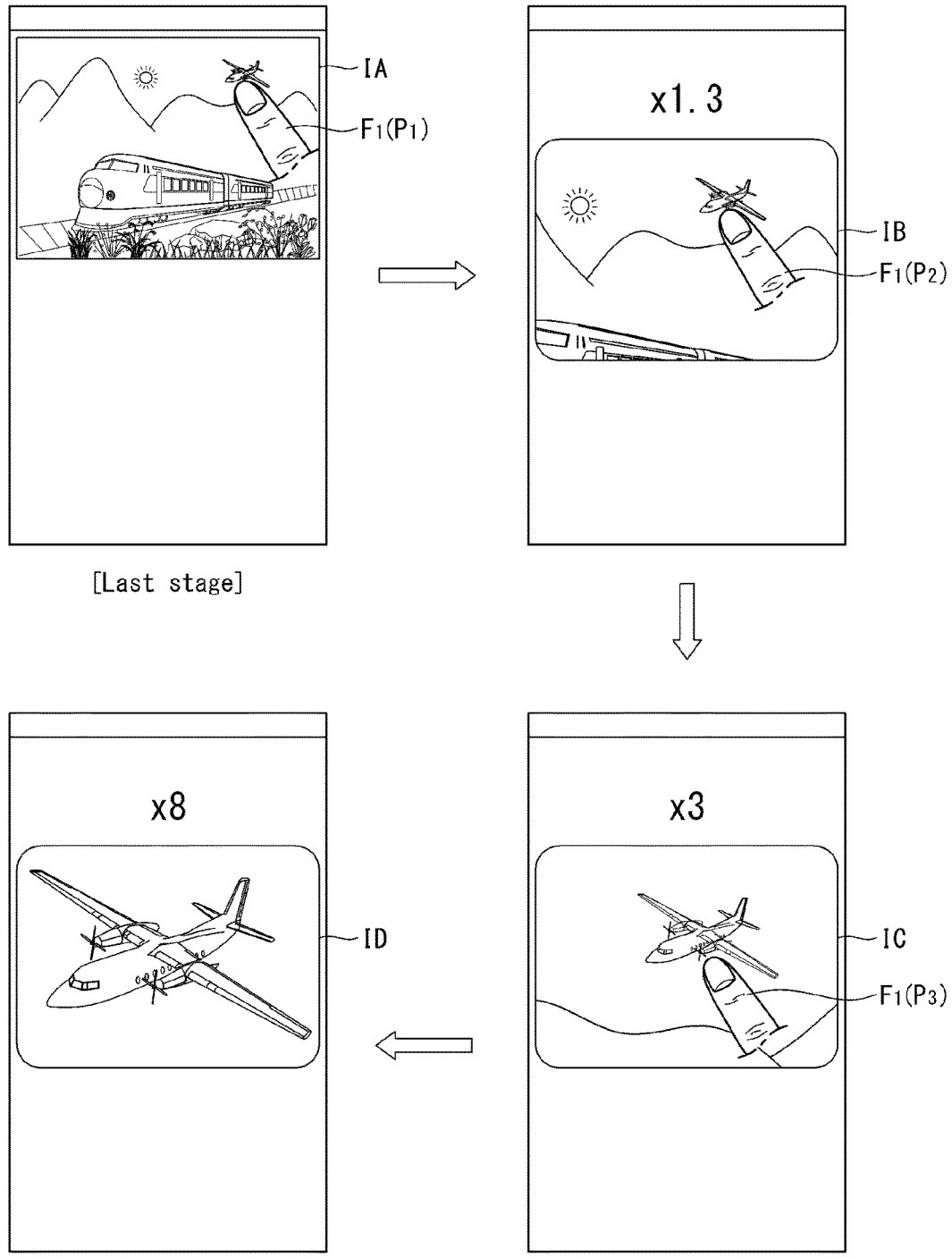

FIGS. 17A to 18 are diagrams for describing a second embodiment of the present invention. The second embodiment of the present invention may be based on the first embodiment or may be combined with at least part of the first embodiment.

For example, referring to FIG. 17A, the controller 180 may receive force touch F1 applied to text content (or a URL linked to the text content). When the touch intensity of the force touch F1 exceeds a predetermined critical intensity, the aforementioned first embodiment may be applied to cause view transition to occur in stages and thus the last view may be displayed on the touchscreen 151. The last view may include text.

When second force touch F2 applied to the text is maintained for a predetermined time and/or exceeds a first critical intensity P1, the controller 180 may control the mobile terminal to enter a text designation mode for selecting a text designation range. A text range designated by default in the text designation mode may be words A1 corresponding to the touch point of the second force touch F2.

The controller 180 may display a graphical object indicting the text range designated in the text designation mode in such a manner that the graphical object overlaps with the text in the designated range.

When the touch intensity sequentially changes (P1→P2→P3) with the second force touch F2 maintained, the controller 180 may control the text range designated on the basis of the touch point of the second force touch F2 such that the text range sequentially changes.

Referring to FIG. 17B, when the second force touch F2 exceeds a second critical intensity P2, the controller 180 may change the text designation range to a sentence based range A2. When the second force touch F2 exceeds a third critical intensity P3, the controller 180 may change the text designation range to a paragraph based range A3. When the second force touch F2 exceeds a fourth critical intensity P4, the controller 180 may change the text designation range to entire text A4.

Referring to FIG. 18, the last view may be an image.

When the intensity of force touch applied to a point of the image gradually changes while the force touch is maintained, the controller 180 may control display magnification of the image to change on the basis of the touch point of the force touch.

When force touch F1 applied to a specific point of the image IA provided through the aforementioned last view exceeds a first intensity P1, the controller 180 may display an image IB acquired by magnifying the image IA by a magnification corresponding to the first intensity P1 on the touchscreen 151. As the intensity of the force touch F1 gradually increases to a second intensity P2 and a third intensity P3, images IC and ID magnified by magnifications corresponding to the second intensity and the third intensity may be displayed on the touchscreen 151.

The above-described first embodiment and/or the second embodiment of the present invention are based on an example of changing views on the basis of a plurality of force touch inputs. However, the present invention is not limited thereto.

Figure 19:
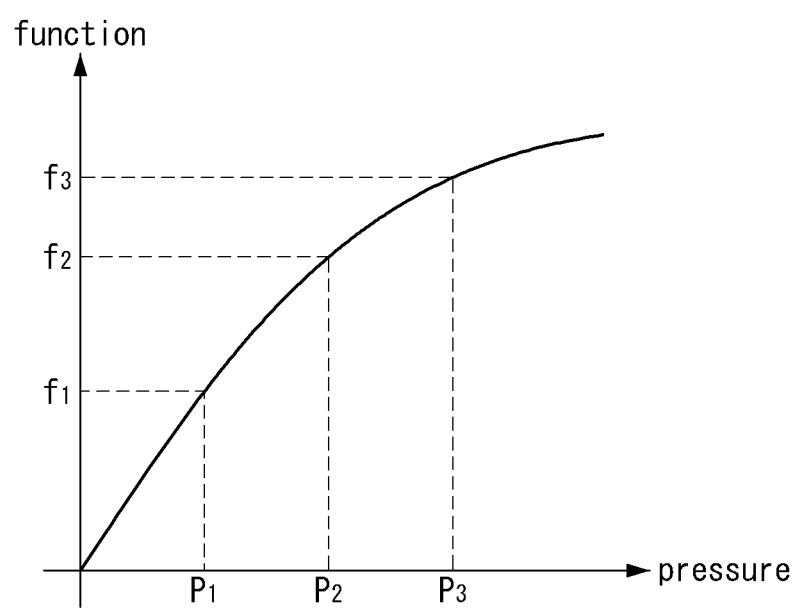
FIG. 19 is a diagram for describing a plurality of functions corresponding to force touch when intensity of force touch changes.

FIG. 19 is a diagram for describing a plurality of functions corresponding to force touch having changing touch intensity.

Referring to FIG. 19, a plurality of functions may be executed during gradual change of touch intensity while force touch input is maintained. The controller 180 may execute a first function F1 when the intensity of the touch input exceeds the first intensity P1 after activation of a force touch function. In addition, the controller 180 may execute a second function F2 when the intensity of the touch input exceeds the first intensity P1 to reach the second intensity P2 while the touch input is maintained. When the intensity of the touch input reaches the third intensity P3, the controller 180 may execute a third function F3.

Here, the first function F1, the second function F2 and the third function F3 may correspond to different functions.

For example, the different functions may include one or more of a function of changing pages related to a force-touched application (item), a function of providing an authentication interface for performing an authentication procedure when force-touched content is content for which security has been set, a function of increasing or decreasing the size of force-touched content, and a function of varying a range of designating force-touched text. At least two functions of the functions may be combined.

The first embodiment and/or the second embodiment of the present invention have been described on the basis of a case in which view transition occurs according to a plurality of force touch inputs. That is, the position of an image in a first view may differ from the position of the item in a second view switched from the first view. Accordingly, to apply force touch for the item to a changed view, the position of force touch needs to be continuously changed.

Accordingly, a third embodiment of the present invention may separate a second layer to which force touch is applied from a first layer which displays a view changed according to force touch. That is, it is possible to change views provided to the first layer by gradually changing only touch intensity after force touch is applied to a specific point of the second layer once.

Figure 20:
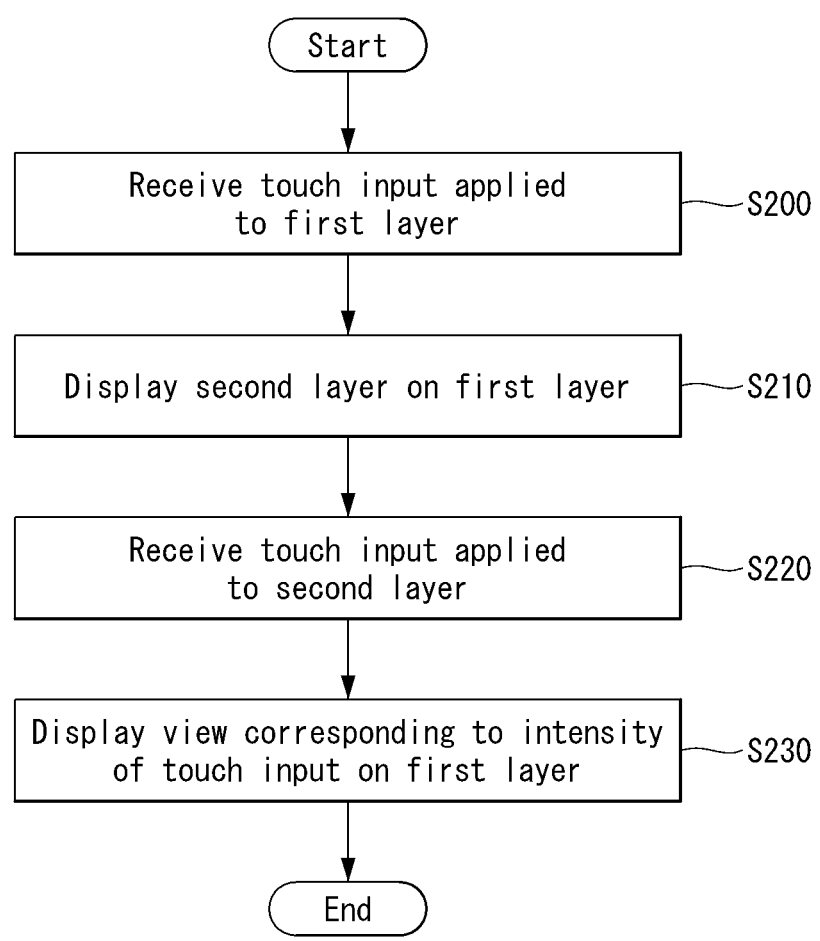
FIG. 20 is a flowchart illustrating a method of controlling a mobile terminal according to a third embodiment of the present invention.

FIG. 20 is a flowchart illustrating a method of controlling a mobile terminal according to the third embodiment of the present invention and FIGS. 21 to 25 are diagrams for describing the third embodiment of the present invention. The third embodiment of the present invention may be based on the first embodiment and/or the second embodiment of the present invention or combined with at least part of the first embodiment and/or the second embodiment of the present invention.

Referring to FIG. 10, the controller 180 may receive predetermined touch input in a state in which a first layer is displayed in the entire area of the touchscreen 151 (S200).

Referring back to FIG. 6, the predetermined touch input may include swipe input applied to the bottom edge of the touchscreen. The swipe input may include drag input applied toward the center of the touchscreen from the bottom edge. Further, the swipe input may include swipe input applied to the control region M provided to the bottom edge of the touchscreen. Examples of the predetermined touch input are not limited to the aforementioned examples.

The controller 180 may display a second layer such that the second layer overlaps with part of the first layer in response to the predetermined touch input (S210).

As shown in FIG. 6, the second layer L2 may have a predetermined height in a lower area of the touchscreen 151 and may occupy a bottom half of the entire area of the touchscreen 151. The second layer L2 can be displayed at any position at which the second layer L2 overlaps with part of the first layer L1.

However, according to an embodiment of the present invention, it is desirable that the second layer L2 be displayed in a lower area of the touchscreen 151 in consideration of the fact that force touch and/or fingerprint authentication are performed through the second layer L2, convenience of user input for executing a force touch function and a fingerprint authentication function while a user grips the mobile terminal with one hand, and the like.

When force touch input applied to the second layer is received and touch intensity of the force touch input varies, the controller 180 may display a view corresponding to the touch intensity on the first layer (S230). Here, display of the second layer is maintained.

When the intensity of force touch applied to a specific point of the second layer exceeds a predetermined critical intensity, the controller 180 may change the view of the first layer.

Figure 21:
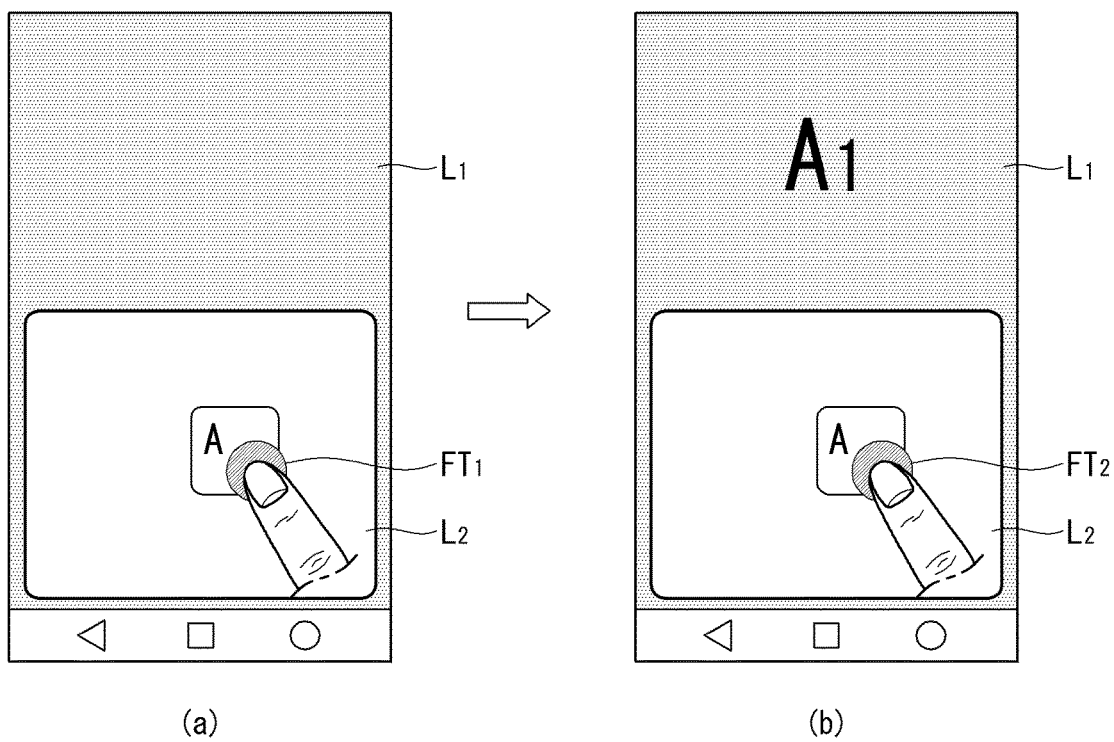
FIGS. 21 to 25 are diagrams for describing the third embodiment of the present invention.

Referring to FIG. 21, when the intensity of first touch input applied to an item A, which is provided to the second layer L2 while the first layer L1 and the second layer L2 are displayed on the touchscreen 151, exceeds a first critical intensity FT1, a first view A1 related to the item may be displayed on the first layer L1 while display of the second layer L2 is maintained.

The first touch input may be force touch input.

The first touch input applied to the second layer L2 may be maintained while the first view A1 is displayed on the first layer L1. Further, the view displayed on the first layer L1 may not change even when the first touch input applied to the second layer L2 is released.

In addition, when touch intensity variation is detected through the force sensor after the first touch input is applied, the controller 180 may display a graphical indicator by which the touch intensity variation can be visually recognized at the touch point. The size of the graphical indicator may increase as touch intensity increases. The shape of the graphical indicator may correspond to the shape of a touched icon. When the icon has a rectangular shape, a graphical indicator having a rectangular shape surrounding the icon and the rectangular shape may be enlarged as the touch intensity increases. When the icon has a circular shape, a circular graphical indicator may be provided.

Furthermore, the controller 180 may output haptic feedback whenever the intensity of the force touch reaches a critical intensity which causes function change.

Figure 22:
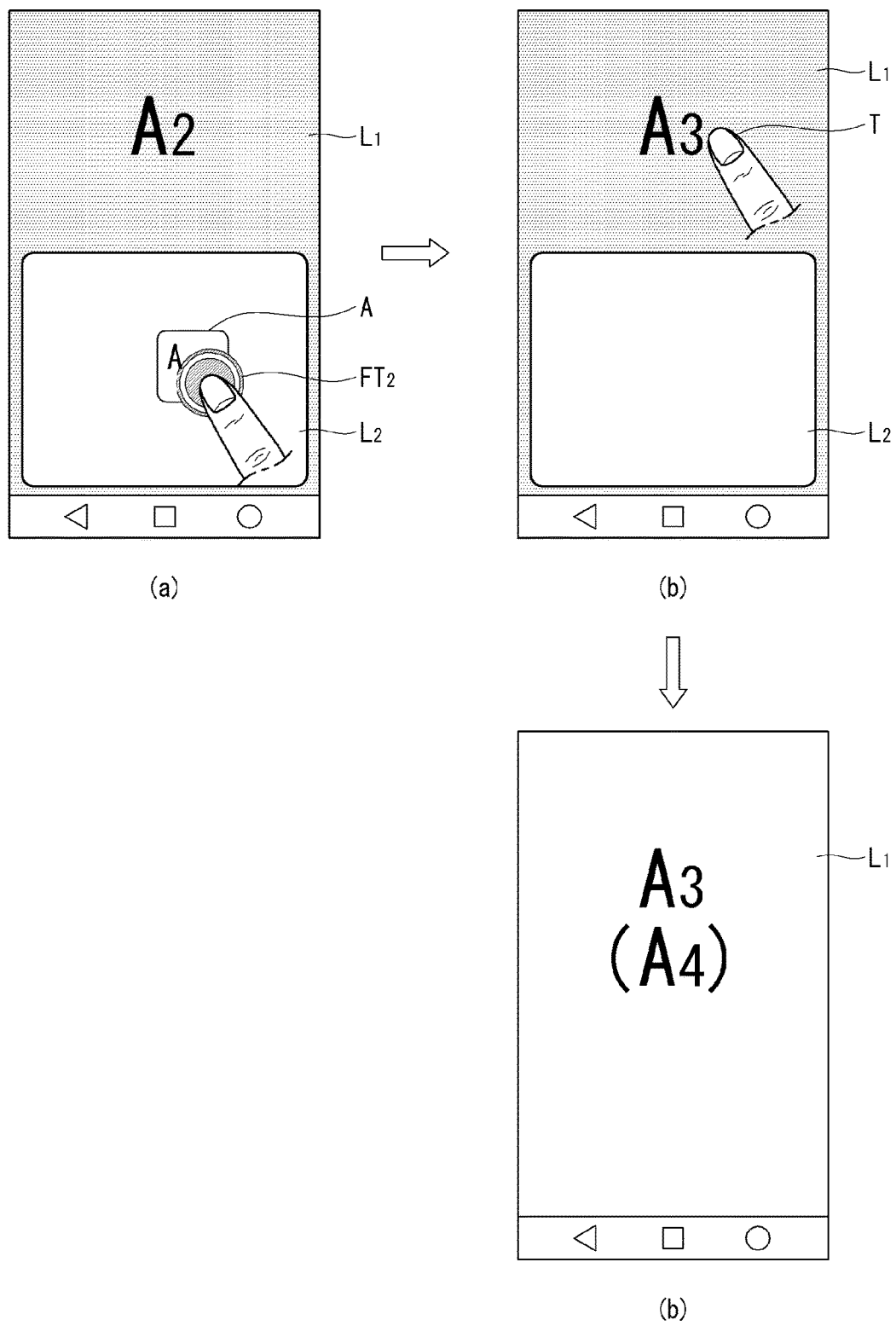

Referring to FIG. 22, when the touch intensity of the first touch input applied to the second layer L2 exceeds a second critical intensity FT2, the controller 180 may switch the first view A1 related to the item to a second view A2 and display the second view A2 on the first layer L1.

When the intensity of the first touch input applied to the second layer L2 and maintained gradually increases from the second critical intensity and exceeds a third critical intensity FT3, the controller 180 may switch from the second view A2 related to the item to a third view A3 and display the third view A3 on the first layer L1.

Upon reception of touch input applied to the first layer L1 while the first layer L1 and the second layer L2 are displayed, the controller 180 may remove the second layer L2. In this case, the first layer L1 may maintain display of the third view A3 related to the item or display a fourth view A4 related to the item.

Figure 23A:
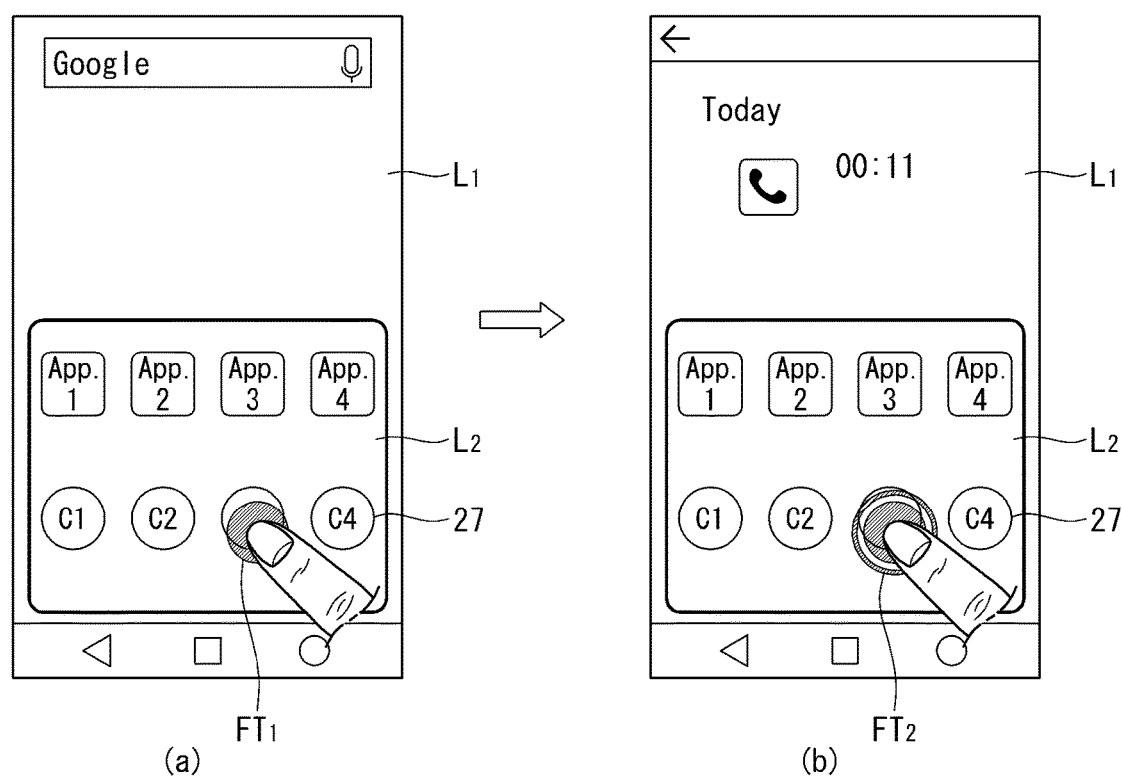
Figure 23B:
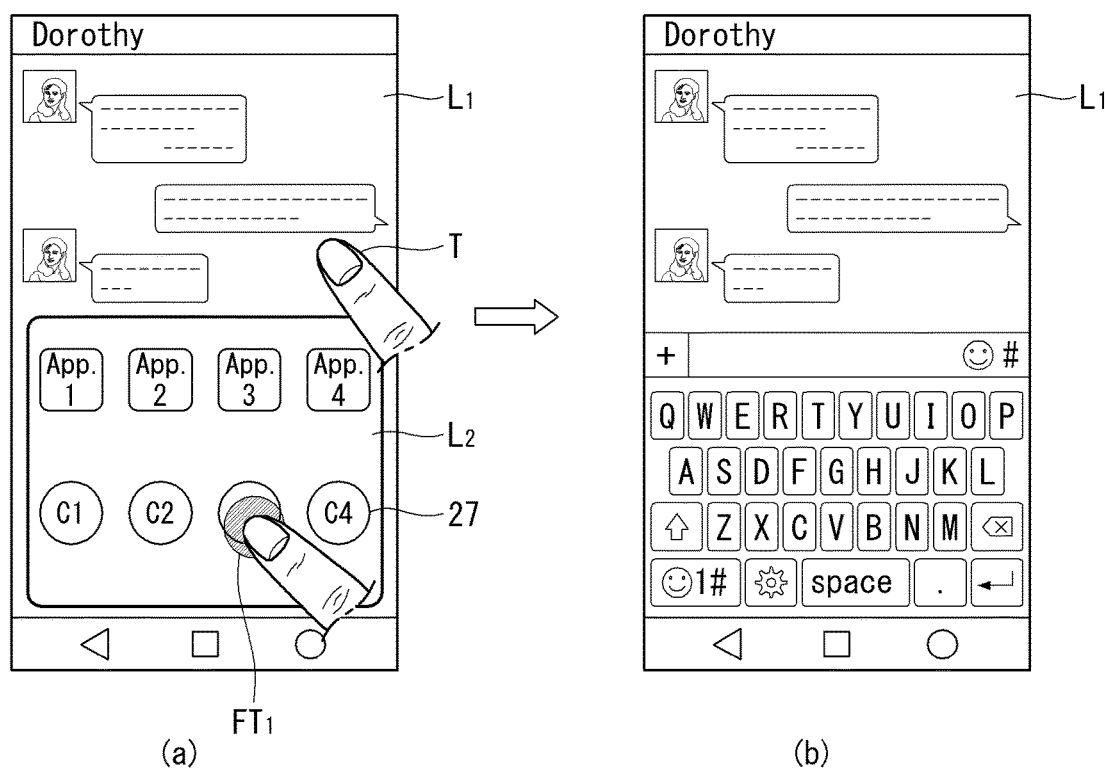

FIGS. 23A and 23B illustrate an example in which the third embodiment of the present invention is applied to a contact item among items provided to the second layer L2.

The second layer L2 may include one or more application icons App1, App2, App3 and App4, and icons C1, C2, C3 and C4 corresponding to one or more contacts. The icons included in the second layer L2 may correspond to items set by a user as bookmarks. For example, the items may include frequently used applications, information on frequently contacted persons, etc.

When force touch applied to the icon C3 corresponding to a first contact exceeds the first critical intensity FT1, the controller 180 may display a call history with respect to the first contact on the first layer L1 while display of the second layer L2 is maintained. The call history may be displayed in an area of the first layer L1 which does not overlap with the second layer L2.

When the force touch applied to the icon C3 corresponding to the first contact exceeds the second critical intensity FT2, the controller 180 may display a chat window including contents of chatting with the first contact on the first layer L1 using a predetermined messenger application while display of the second layer L2 is maintained, as shown in FIG. 23B. The chat window may be displayed in an area of the first layer L1 which does not overlap with the second layer L2.

Upon reception of touch input T applied to the first layer L1 displaying the chat window, the controller 180 may remove the second layer L2. The area of the first layer L1 which overlaps with the second layer L2 and thus is hidden may display a menu (e.g., a key pad) for executing functions of the messenger application.

According to an embodiment of the present invention, the first embodiment may be applied to a process of receiving force touch input applied to the second layer according to the third embodiment.

Figure 24:
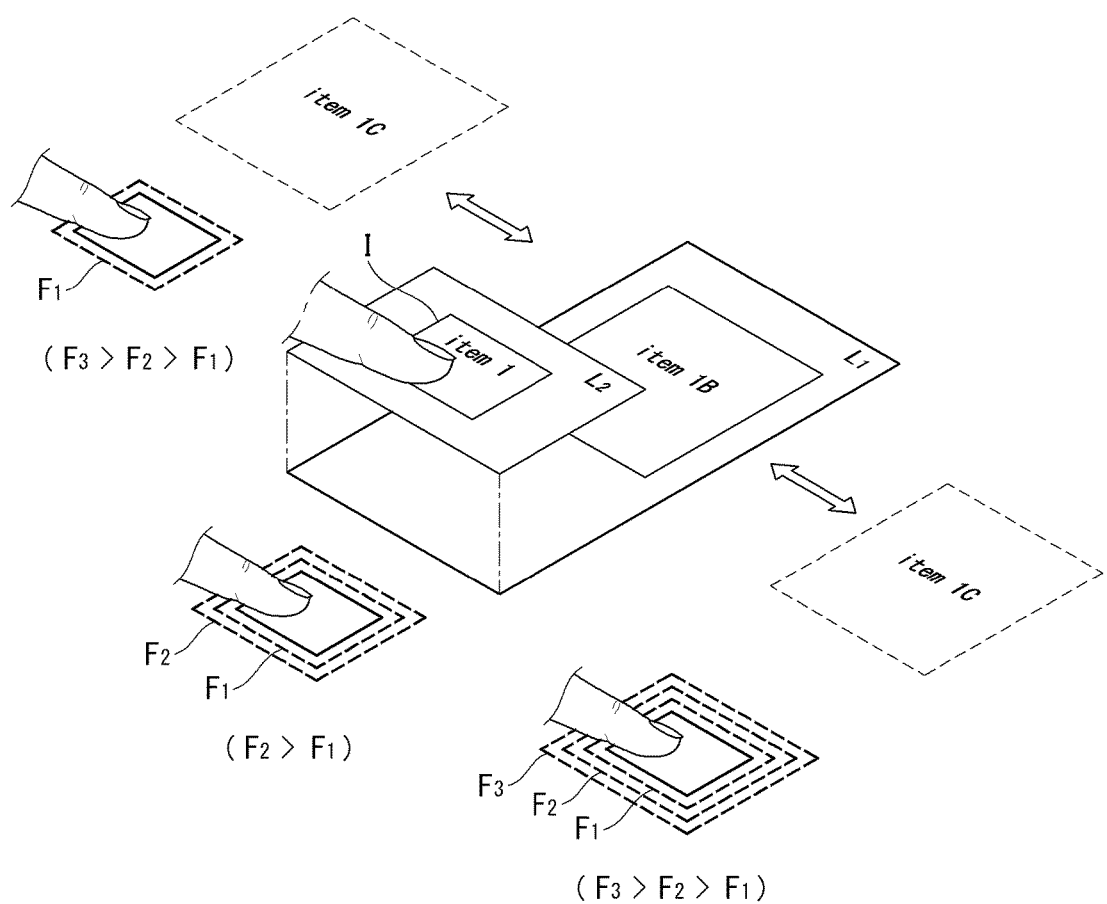

Referring to FIG. 24, the controller 180 may control views related to the item I such that the views switch to a first view item 1, a second view item 2 and a third view item 3 when the intensity of force touch applied to the item I displayed on the second layer L2 changes (F1→F2→F3).

Upon determining view switching on the first layer L1 as the last view when the intensity of the force touch applied to the second layer L2 changes, the controller 180 may output an appropriate feedback to notify the user of the last view.

Figure 25:
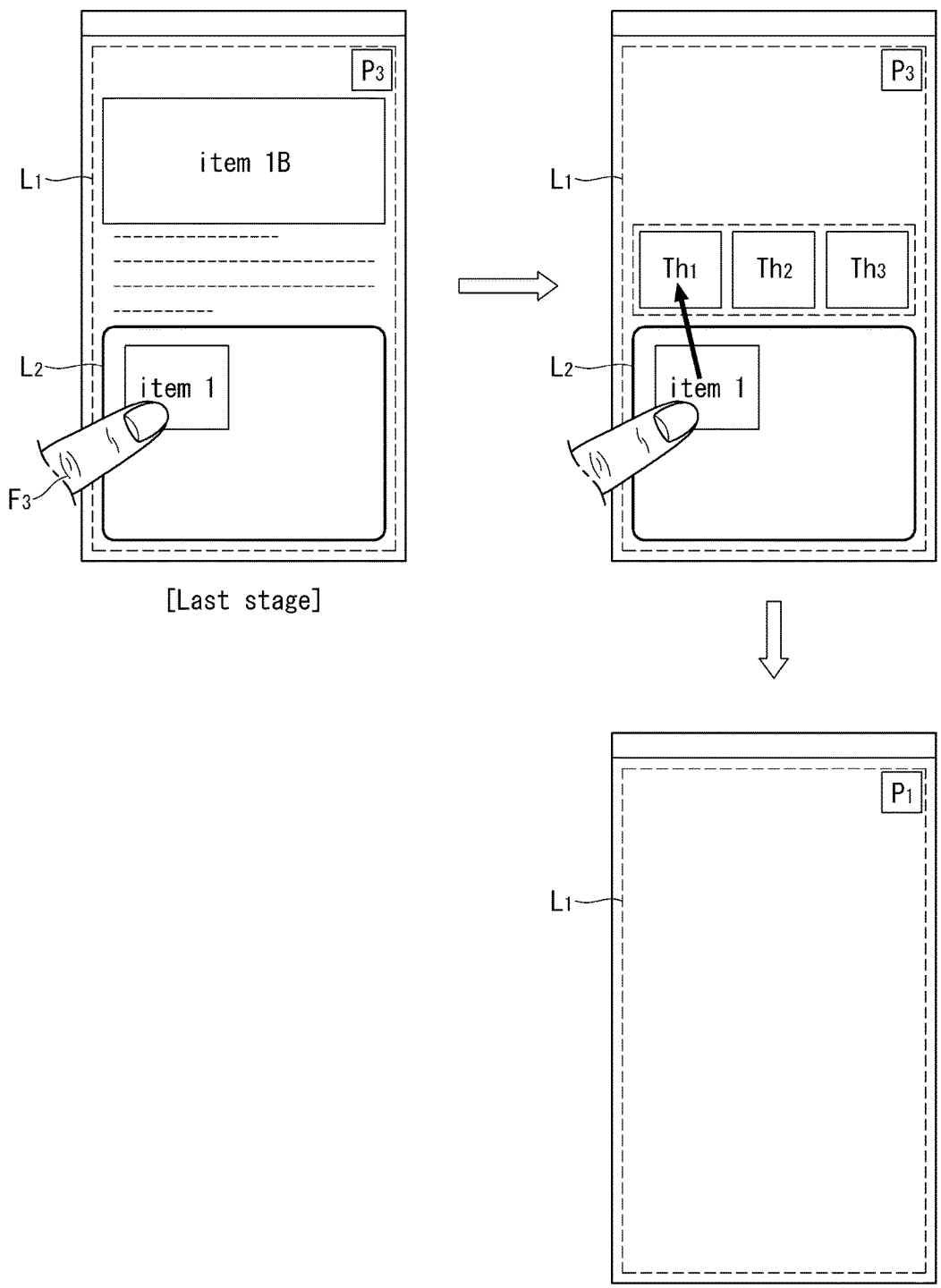

For example, referring to FIG. 25, when page transition on the first layer L1 reaches the last page P3 as the intensity of force touch applied to the second layer L2 changes, and additional force touch applied to the second layer L2 is received, the controller 180 may display preview images Th1, Th2 and Th3 of pages related to the item (item 1) and provided to the first layer L1 in previous stages on the touchscreen 151.

The preview images Th1, Th2 and Th3 may be displayed on one of the first layer L1 and the second layer L2.

Upon reception of touch-and-drag input of dragging touch applied to the second layer L2 to one of the preview images Th1, Th2 and Th3, the controller 180 may display a page P1 corresponding to a selected preview image Th1 on the first layer L1 and remove the second layer L2.

An example of controlling view transitions in the first layer according to force touch applied through the second layer has been described in the third embodiment of the present invention. When content provided to the second layer is accessible only when the content has been authenticated, an additional authentication process may be performed on the second layer.

Figure 26:
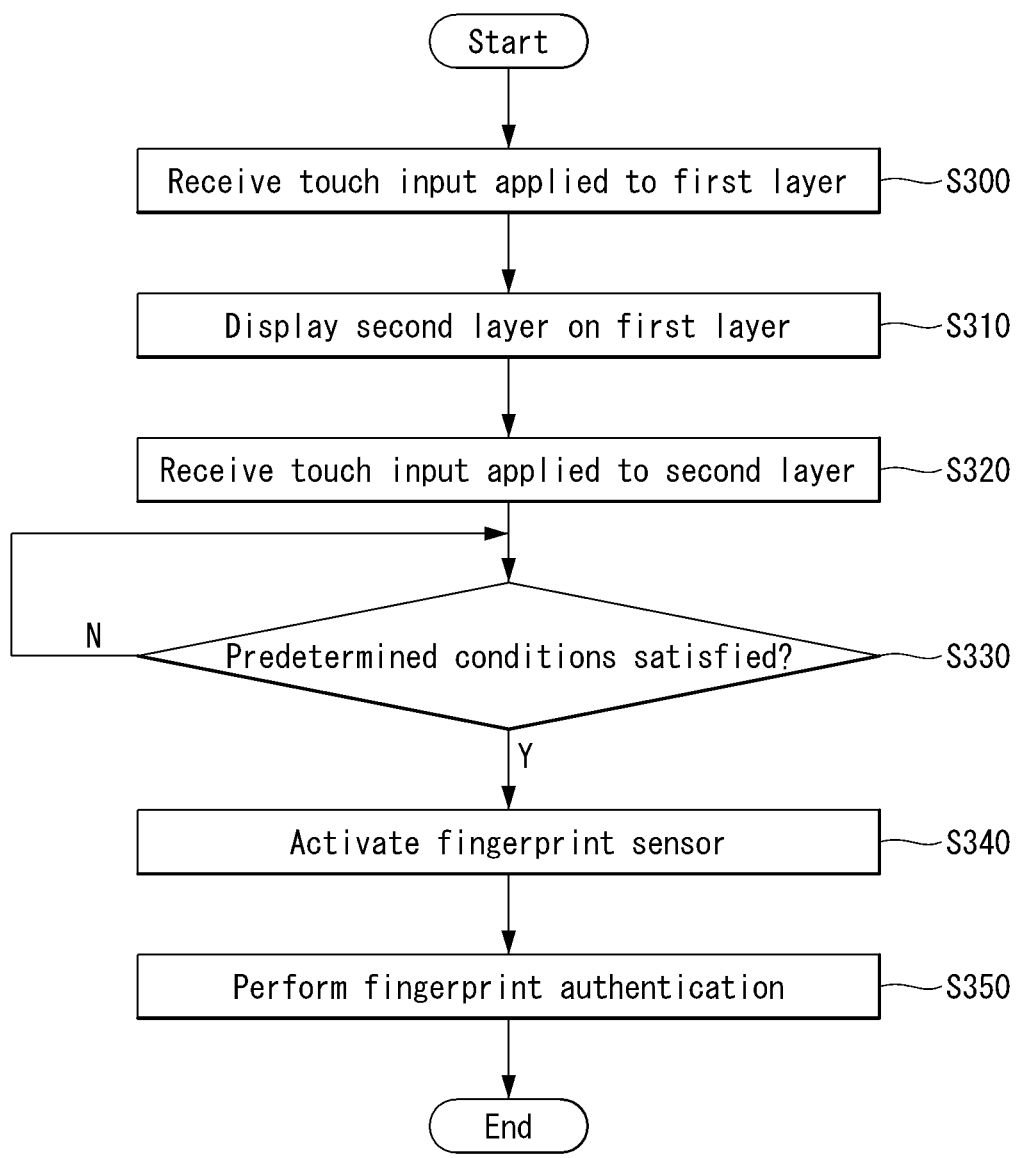
FIG. 26 is a flowchart illustrating a method of controlling a mobile terminal according to a fourth embodiment of the present invention.
Figure 27:
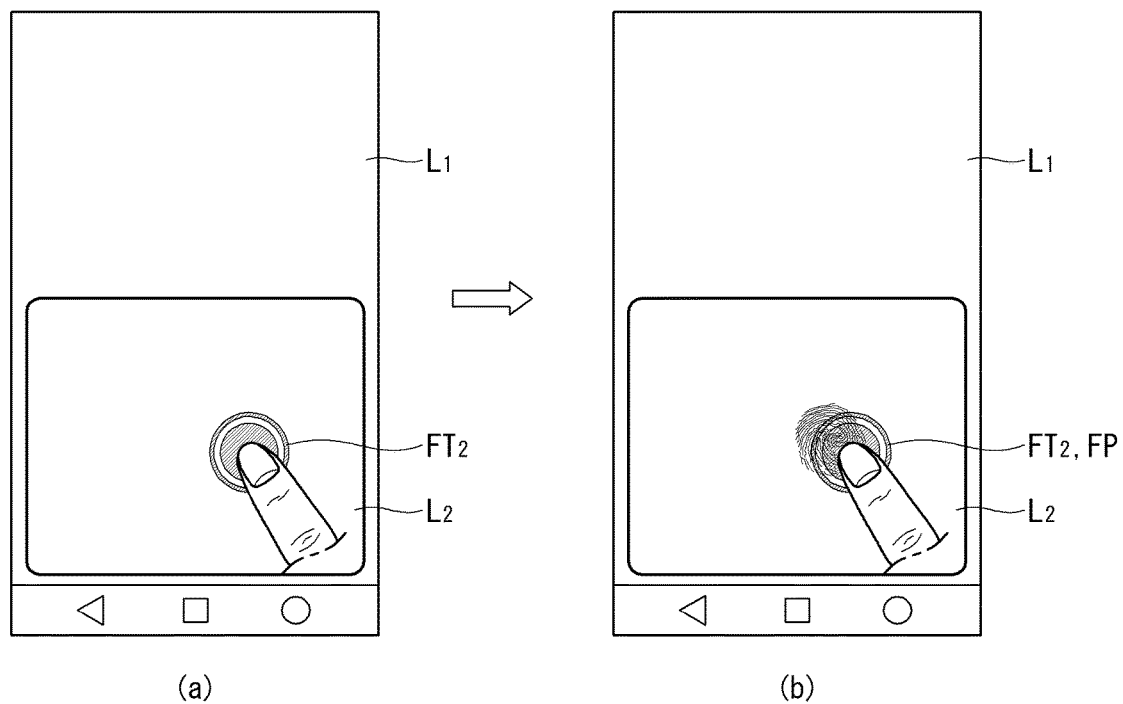
FIGS. 27 and 28 are diagrams for describing the fourth embodiment of the present invention.
Figure 28:
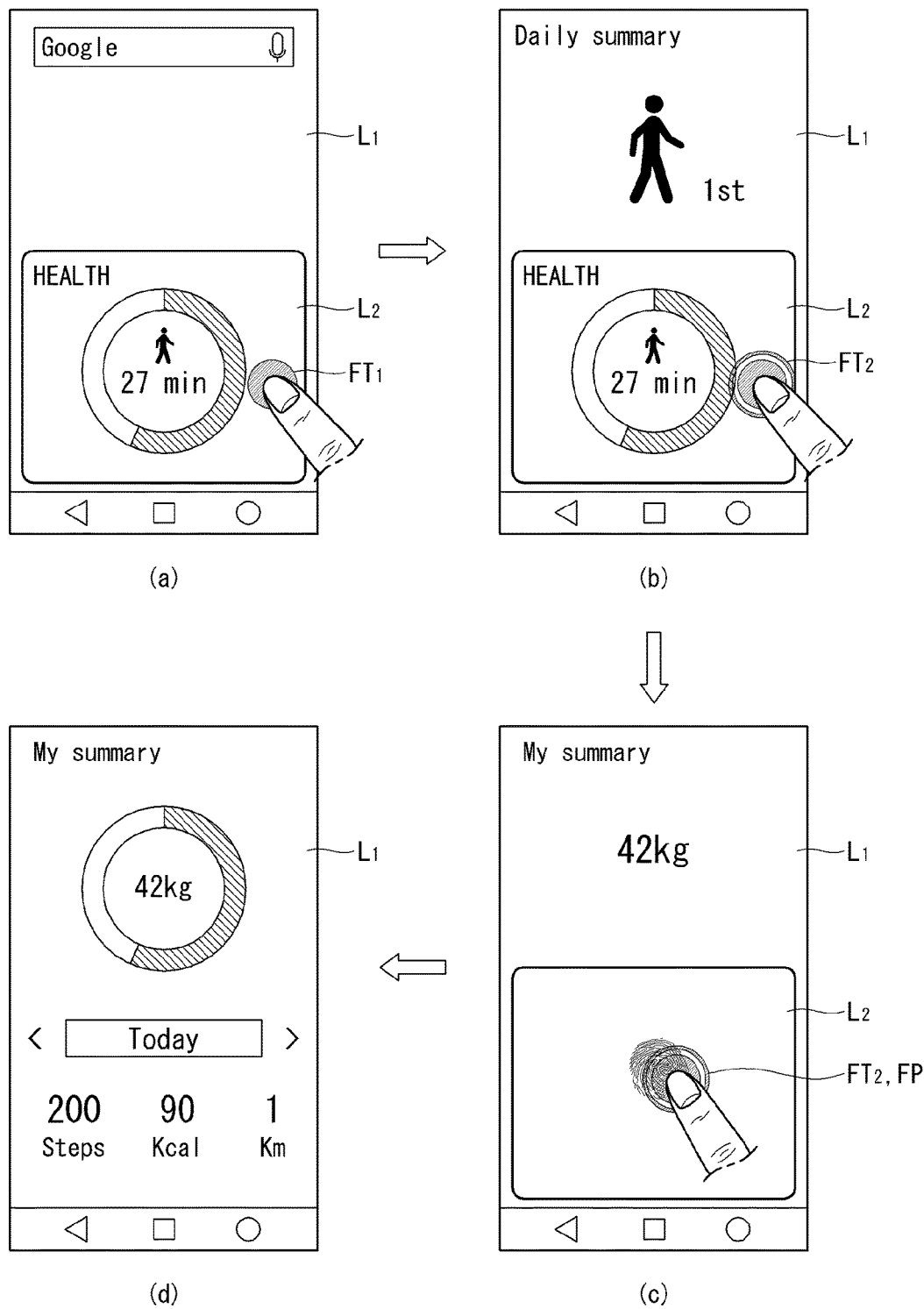

FIG. 26 is a flowchart illustrating a method of controlling a mobile terminal according to a fourth embodiment of the present invention and FIGS. 27 and 28 are diagrams for describing the fourth embodiment of the present invention.

The fourth embodiment of the present invention may be based on the first embodiment, the second embodiment and/or the third embodiment of the present invention or may be combined with at least part of the embodiments.

Referring to FIG. 26, the controller 180 may display the first layer in the entire area of the touchscreen 151. Upon reception of touch input applied to the first layer (S300), the controller 180 may display the second layer on the touchscreen 151 such that the second layer overlaps with part of the first layer (S310). The controller 180 may receive force touch input applied to the second layer (S320). Steps S300 to S320 correspond to steps S200 to S220 described above with reference to FIGS. 6 and 20 and thus detailed description thereof is omitted.

The controller 180 may activate a fingerprint sensor (S340) when the touch input applied to the second layer L2 satisfies predetermined conditions (S330: YES).

The predetermined conditions may include at least one of touch input applied to the second layer and maintained for a predetermined time, touch input having intensity which exceeds a predetermined intensity, and touch input applied to an item which needs to be authenticated.

The fingerprint sensor may employ an ultrasonic sensor as described with reference to FIGS. 1 to 5. It is possible to simultaneously perform recognition of force touch and fingerprint authentication on the second layer using the ultrasonic sensor.

The controller 180 may perform fingerprint authentication according to a sensing result of the activated fingerprint sensor (S350) and perform operation according to an authentication result.

Referring to FIG. 27, when the touch intensity of the touch input applied to the second layer L2 gradually changes and exceeds the second critical intensity FT2, the controller 180 may activate the aforementioned fingerprint sensor and perform fingerprint authentication while the second critical intensity FT2 is maintained. That is, fingerprint authentication may be performed when force touch input reaches a predetermined intensity without release of the force touch input. Specifically, when the force touch applied to the second layer exceeds a predetermined intensity, the controller 180 uses the second layer as an interface for fingerprint authentication and recognizes a user fingerprint sensed through the interface using the fingerprint sensor Upon successful fingerprint authentication, the controller 180 may display information additionally provided after fingerprint authentication on the first layer.

Referring to FIG. 28, an item provided through the second layer L2 may be an item accessible through authentication using personal information. For example, the item may be a health application, and body information (height, weight, etc.), exercising, a diet schedule and the like of the user may be registered through the health application.

The controller 180 may display the second layer L2 through the aforementioned predetermined touch input while a home screen or a view provided by default is displayed on the first layer L1. When force touch applied to the second layer L2 exceeds the first critical intensity FT1, the controller 180 may display information provided by the health application on the first layer L1.

When the intensity of the force touch applied to the second layer L2 gradually changes between the first critical intensity FT1 and the second critical intensity FT2, the controller 180 may display menus provided by the health application on the first layer L1 in stages depending on touch intensity.

When the force touch applied to the second layer L2 exceeds the second critical intensity FT2, the controller 180 may activate the fingerprint sensor and perform fingerprint recognition from the force touch input. Upon successful fingerprint authentication, the controller 180 may display personal information for which security has been set among information provided by the health application on the first layer L1.

The fingerprint sensor may be in an activated state irrespective of force touch applied to the second layer L2, and when the intensity of the force touch applied to the second layer L2 exceeds an intensity necessary for fingerprint authentication, may automatically perform fingerprint authentication. The force touch intensity necessary for fingerprint authentication may be preset by the user.

That is, according to an embodiment of the present invention, it is possible to change information provided through a specific application in stages according to force touch intensity and fingerprint authentication by associating force touch with fingerprint authentication operation.

FIG. 29 is a diagram for describing a plurality of pages which can be displayed through the second layer.

Referring to FIG. 29, a plurality of pages P1, P2 and P3 having different attributes may be provided through the second layer L2. That is, upon reception of flicking input applied to the second layer L2, the controller 180 may display one of the plurality of pages, for example, the page P2, on the second layer L2.

The attributes of the plurality of pages may be determined by items displayed on the pages.

The items may include at least one of a setting menu for setting a use environment of the mobile terminal, a widget ((b) of FIG. 29), at least one application ((d) and (e) of FIG. 29) executed in the mobile terminal, and applications ((a) and (c) of FIG. 29) which need to be authenticated.

Pages provided through the second layer L2 may be edited (added or deleted) by the user.

The second layer applied to an embodiment of the present invention may be displayed even when the mobile terminal is in a locked state.

Figure 30:
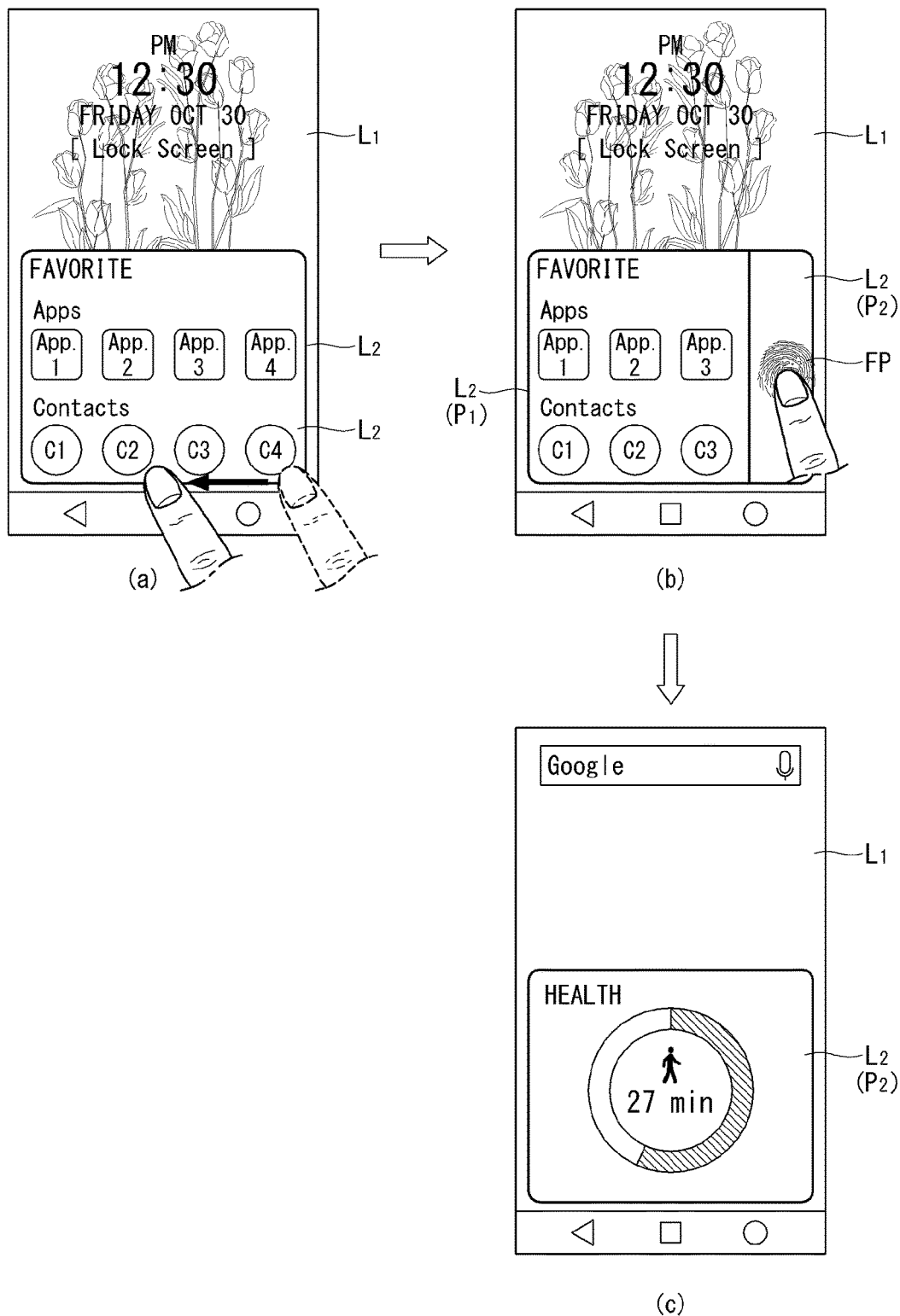

FIGS. 30 and 31 are diagrams for describing a case in which an embodiment of the present invention is applied to a mobile terminal in a locked state.

Referring to FIG. 30, when the mobile terminal 100 is in a locked state, a lock screen may be displayed on the first layer L1. When swipe input starting from the bottom edge of the touchscreen 151 is applied to the lock screen, the controller 180 may display the second layer L2 such that the second layer L2 overlaps with part of the lock screen.

The second layer L2 may have a plurality of pages having different attributes as described above. When a page to be displayed on the second layer L2 requires user authentication during transition between pages displayed on the second layer in response to flicking input, the page may be displayed on the second layer L2 after fingerprint authentication.

In this case, touch input applied to the second layer L2 may be one of normal touch input and force touch input.

Upon successful completion of fingerprint authentication through the second layer L2, the controller 180 may release the lock state of the mobile terminal, display an unlock screen on the first layer L1 and display a page provided after user authentication on the second layer L2.

The controller 180 may display only a specific region L2 (P2) of the second page on the second layer L2 in response to the flicking input and provide a fingerprint authentication interface through the region. The controller 180 may display the entire second page P2 on the second layer L2 upon completion of fingerprint authentication through the fingerprint authentication interface.

Referring to FIG. 31, the controller 180 may display the lock screen on the first layer L1 and display a payment card image 28 according to execution of a payment application on the second layer L2.

When normal touch input is applied to the payment card image 28, the controller 180 may perform no operation because the mobile terminal is locked.

When force touch applied to the payment card image 28 displayed on the second layer L2 exceeds a predetermined intensity FT, the controller 180 may display details of payment (recent details of payment) of the payment card on the lock screen of the first layer L1.

According to an embodiment of the present invention, it is possible to access information which requires authentication in a lock state of the mobile terminal through a simpler method by applying force touch sensed through the second layer in association with fingerprint authentication without releasing the lock state and directly entering a payment application execution screen.

Figure 33:
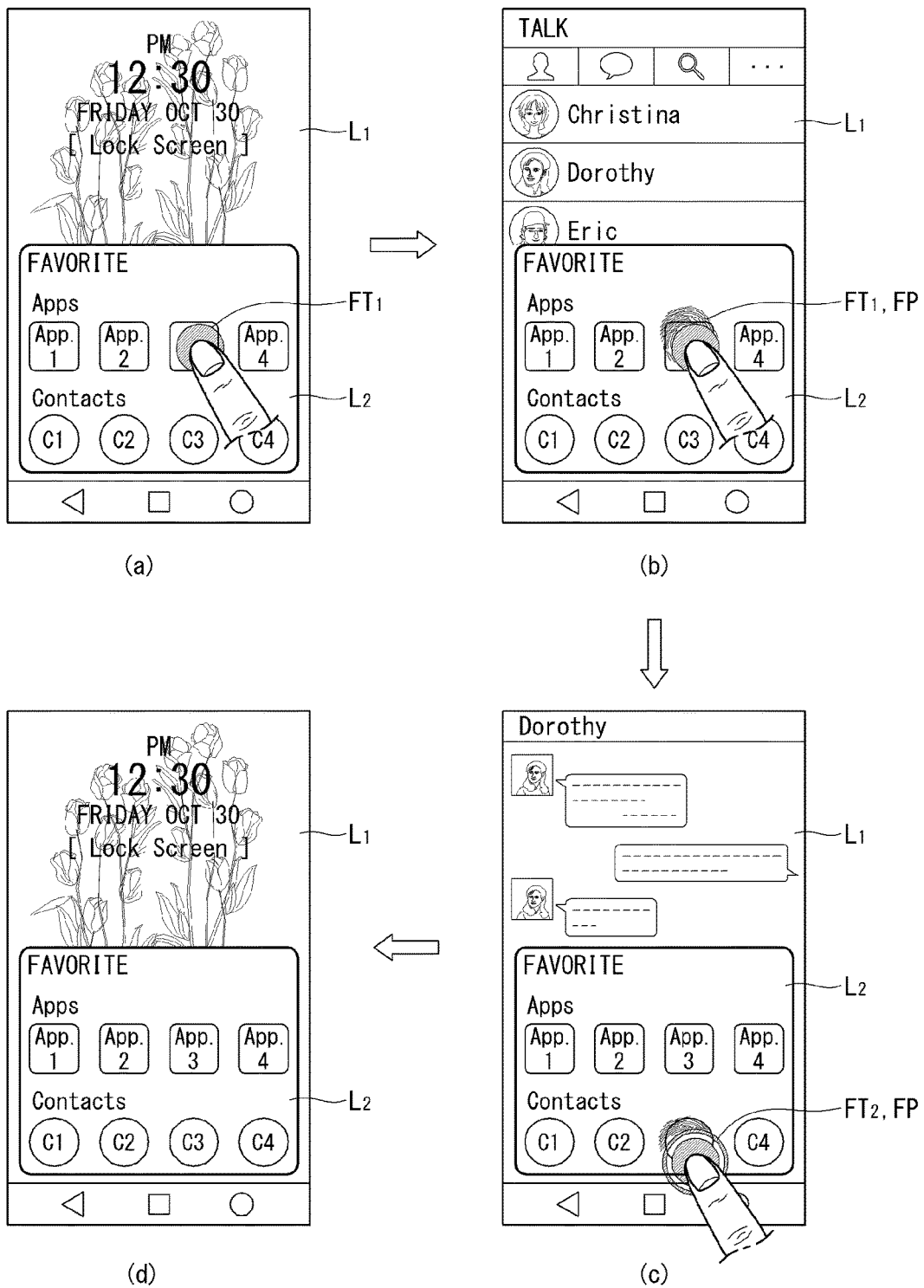

FIGS. 32 and 33 are diagrams for describing an example in which the force touch function is implemented by being combined with the fingerprint sensing function according to an embodiment of the present invention.

Referring to FIG. 32, the controller 180 may display a payment card image on the second layer L2. When force touch applied to the second layer L2 exceeds the first critical intensity FT1, the controller 180 may provide details of use of the payment card to the first layer L1.

When the force touch applied to the second layer L2 exceeds the second critical intensity FT2, the controller 180 may provide an interface screen for registering a new card to the first layer L1.

When the force touch applied to the second layer L2 exceeds the third critical intensity FT3, the controller 180 may acquire fingerprint information of the user using the fingerprint sensor through touch input which causes the third critical intensity FT3. Upon completion of fingerprint authentication, the controller 180 may perform mobile payment operation using the card corresponding to the card image displayed on the second layer L2.

Referring to FIG. 33, upon reception of predetermined input while a lock screen is displayed on the first layer L1, the controller 180 may display the second layer L2 on the touchscreen 151.

When force touch applied to the messenger application included in the second layer L2 exceeds the first critical intensity FT1, the controller 180 may perform fingerprint authentication. Upon completion of fingerprint authentication, the controller 180 may release a lock state and display chat windows using the messenger application on the first layer L1. The chat windows may be aligned in conversation order.

In addition, when force touch input applied to a first user C3 displayed on the second layer L2 exceeds the first critical intensity FT1, the controller 180 may perform additional fingerprint authentication and may display a chat window for chatting with the first user C3 on the first layer L1 upon completion of fingerprint authentication.

Figure 34:
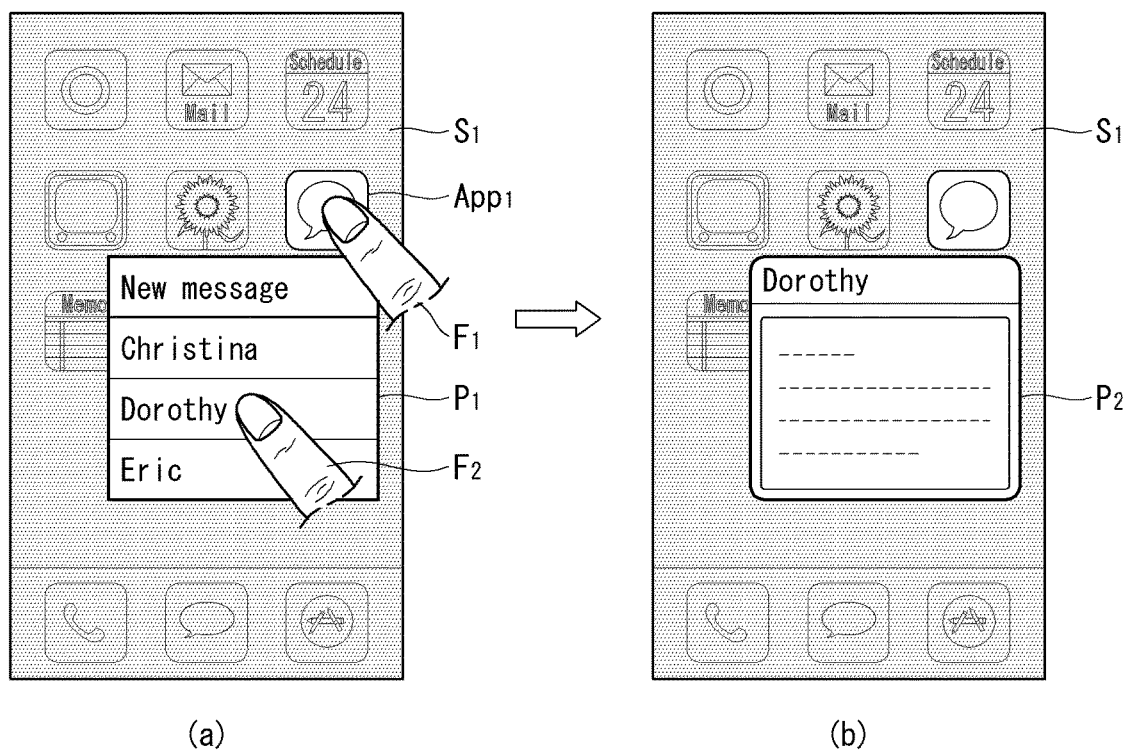
FIGS. 34 to 36 are diagrams for describing operations of the mobile terminal according to other embodiments of the present invention.
Figure 35:
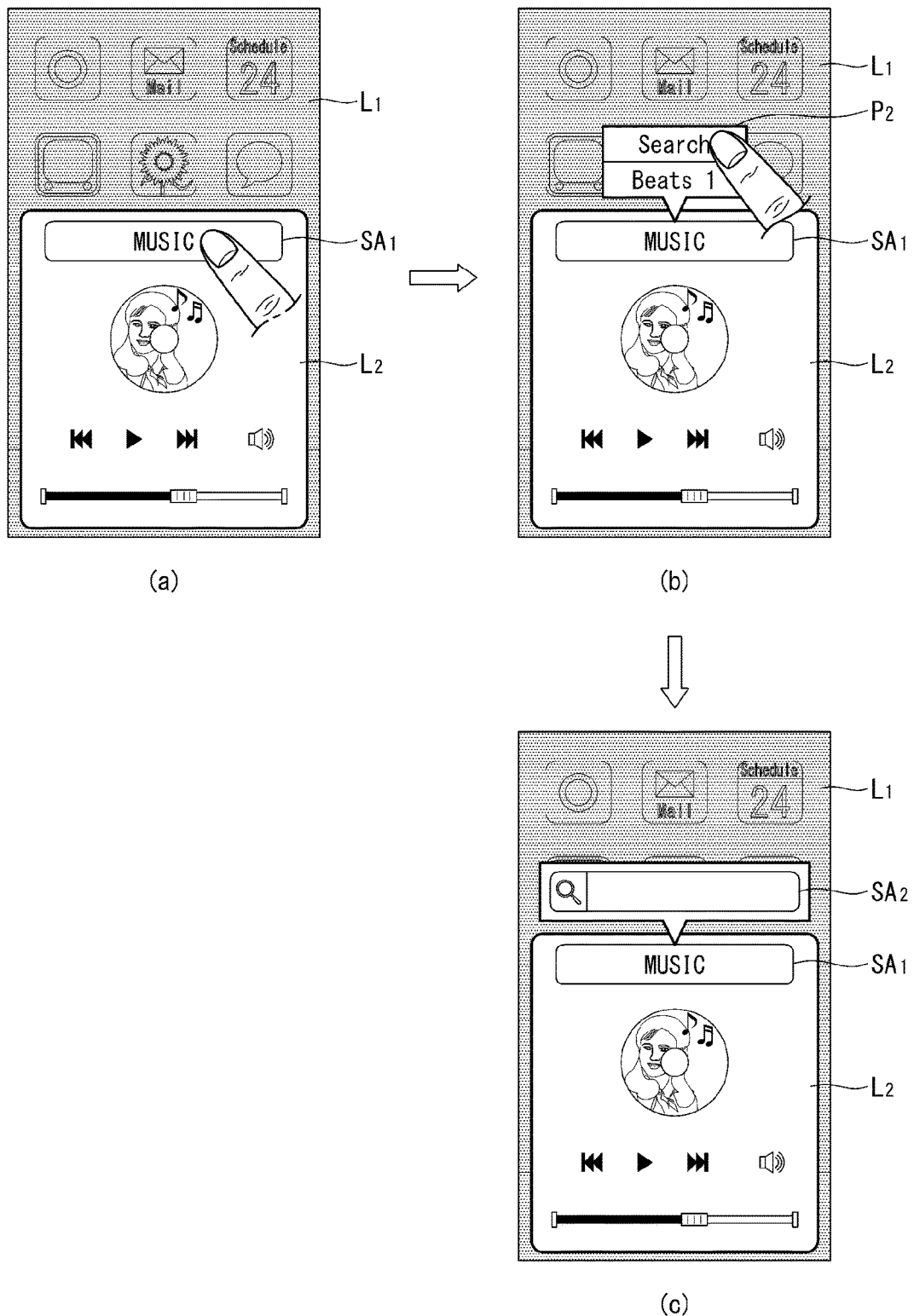
Figure 36:
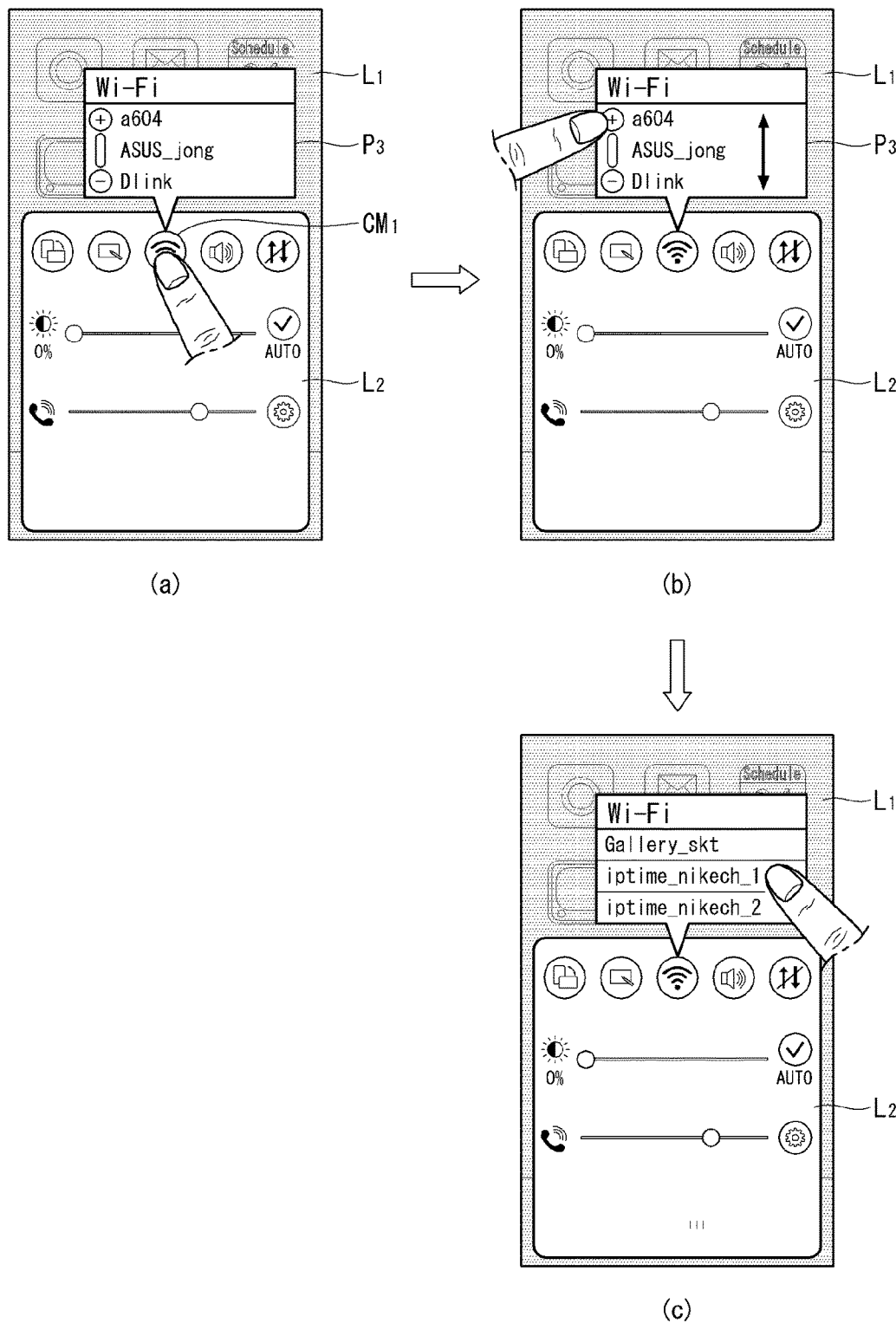

FIGS. 34 to 36 are diagrams for describing operations of the mobile terminal according to other embodiments of the present invention.

Referring to FIG. 34, the controller 180 may receive force touch applied to a message application App1 included in the home screen S1. When the force touch exceeds a critical intensity F1, the controller 180 may display a pop-up window P1 including at least one menu which can be executed using the message application such that the pop-up window P1 overlaps with at least part of the home screen without entering an execution screen of the message application. The home screen S1 may be blurred.

The at least one menu may include information about a counterparty to/from which messages are transmitted/received. When force touch applied to a specific counterparty exceeds a critical intensity F2, an input window for transmitting a message to the specific counterpart may be displayed in the pop-up window P1. Accordingly, it is possible to easily transmit a message through force touch without directly executing the message application.

Referring to FIG. 35, when the first layer L1 and the second layer L2 are displayed and force touch input is applied to a music player application SA1 included in the second layer L2, a first pop-up window P2 including menus related to the music player application may be additionally displayed. When additional force touch is applied to a search menu among the menus included in the pop-up window P2, a second pop-up window SA2 through which desired music can be searched for may be displayed without execution of the music play application. The first pop-up window P2 and the second pop-up window SA2 may be provided in a state in which the second layer L2 is displayed.

Referring to FIG. 36, when the first layer L1 and the second layer L2 are displayed and force touch is applied to a setting menu CM1 included in the second layer L2, a pop-up window P3 including at least one scrollable data list may be provided. The controller 180 may select desired data through scroll input applied to the pop-up window P3 in a state in which the first and second layers L1 and L2 are displayed and apply the selected data to setting of an environment of the mobile terminal.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
 a body;
 a cover glass provided to a front side of the body;
 a touch sensor configured to sense a touch input to the cover glass;
 a display configured to display information;
 a fingerprint sensor configured to sense a fingerprint of a user through the touch input to the cover glass;
 a force sensor configured to sense a touch intensity of a touch input applied to the cover glass; and
 a controller configured to:
 control a first screen including an item having a view transition in stages to be displayed on the display according to a selected input,
 control views related to the item to change when an intensity of a first touch input applied to the item exceeds a critical intensity, and
 control a predetermined feedback to be output when a changed view is a view of a last stage among the stages,
 wherein the predetermined feedback comprises displaying at least one thumbnail image corresponding to at least one view sequentially displayed prior to the last stage on the display,
 wherein the controller is configured to display a view of the last stage along with the at least one thumbnail image on the display,
 wherein the controller is configured to:
 display a first layer in the entire area of the display,
 display a second layer on the display such that the second layer overlaps with part of the first layer upon reception of a predetermined touch input,
 control a view displayed on the first layer while display of the second layer is maintained when an intensity of a touch input applied to the second layer is changed, and
 when the touch input applied to the second layer satisfies at least one of an input maintained for a predetermined time exceeding a predetermined intensity and an input applied to an item which requires authentication, activate a function of the fingerprint sensor to perform fingerprint authentication according to the touch input, wherein the item is included in the second layer and includes information additionally provided after fingerprint authentication and the controller displays the additionally provided information on the first layer after the fingerprint authentication.

2. The mobile terminal according to claim 1, wherein the controller is configured to control the predetermined feedback to be output while the view of the last stage is maintained when an intensity of a second touch input applied to the view of the last stage exceeds the critical intensity.

3. The mobile terminal according to claim 1, wherein the controller is configured to determine a currently displayed view as the view of the last stage related to the item when there is no view to be changed with respect to the item.

4. The mobile terminal according to claim 1, wherein the controller is configured to change the first screen to a first view related to the item when the intensity of the first touch input exceeds the critical intensity, to change the first view to a second view and display the second view when intensity of the second touch input applied to the first view exceeds the critical intensity, and to determine the first view as the last view when the second view is identical to the first view.

5. The mobile terminal according to claim 1, wherein the controller is configured to display the thumbnail image on the display upon reception of an additional touch input applied to the view of the last stage and having intensity exceeding the critical intensity.

6. The mobile terminal according to claim 1, wherein the thumbnail image is displayed in one of upper and lower areas of the display.

7. The mobile terminal according to claim 1, wherein, when an input for selecting one of the at least one thumbnail image is received, the controller is configured to display a view of a stage corresponding to the selected thumbnail image on the display.

8. The mobile terminal according to claim 1, wherein the first view is a webpage including at least one item mapped to link information used to enter the next stage.

9. The mobile terminal according to claim 8, wherein the at least one item includes at least one of text, an image, a moving image and a graphical object.

10. The mobile terminal according to claim 1, wherein the view of the last stage includes text,
wherein the controller is configured to enter a mode for selecting a text designation range when second touch input applied to the text is maintained for a predetermined time and to control a text range designated on the basis of the touch point of the second touch input to be sequentially changed when intensity of the second touch input sequentially changes while the second touch input is maintained.

11. The mobile terminal according to claim 10, wherein the designated text range includes at least one of a word, a sentence and a paragraph.

12. The mobile terminal according to claim 1, wherein the view of the last stage includes an image,
wherein the controller is configured to control a display magnification of the image to be changed on the basis of the touch point of the second touch input applied to a point of the image when the intensity of the second touch input sequentially changes while the second touch input is maintained.

13. The mobile terminal according to claim 1, further comprising a haptic module,
wherein the controller is configured to control the haptic module to output a haptic signal having specific intensity simultaneously with transition of views related to the item when the intensity of the first touch input exceeds the critical intensity.

14. The mobile terminal according to claim 13, wherein the haptic signal is output whenever transition of views related to the item occurs.

15. The mobile terminal according to claim 1, wherein the controller is configured to display a pop-up view related to the item such that the pop-up view overlaps with at least part of the first screen while display of the first screen is maintained when the intensity of the first touch input corresponds to a first critical intensity, to control views related to the item to change when the intensity of the first touch input exceeds a second critical intensity greater than the first critical intensity while the first touch input is maintained, and to display a changed view instead of the first screen on the display.

16. The mobile terminal according to claim 1, wherein the force sensor includes at least one of a capacitive sensor and an ultrasonic sensor.

17. The mobile terminal according to claim 1, wherein the first screen includes a second layer displayed while overlapping with at least part of a first layer through swipe input applied to a bottom edge of the display in a state in which the first layer is displayed in the entire area of the display, and
wherein the second layer includes at least one application executable in the mobile terminal or at least one control menu through which a use environment of the mobile terminal is set.

18. The mobile terminal according to claim 1, wherein the controller is configured to:
in response to a selection of the at least one thumbnail image displayed with the last stage, navigate back and display a view of a preceding stage corresponding to the at least one thumbnail.

\* \* \* \* \*